United States Patent
Niwata et al.

(10) Patent No.: US 10,629,904 B2
(45) Date of Patent: Apr. 21, 2020

(54) POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

(71) Applicant: Murata Manufacturing Co., Ltd., Kyoto (JP)

(72) Inventors: Yuki Niwata, Fukushima (JP); Shingo Nakasato, Fukushima (JP); Asuki Yanagihara, Fukushima (JP); Yosuke Hosoya, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 357 days.

(21) Appl. No.: 15/325,937

(22) PCT Filed: Jul. 6, 2015

(86) PCT No.: PCT/JP2015/003376
§ 371 (c)(1),
(2) Date: Jan. 12, 2017

(87) PCT Pub. No.: WO2016/017071
PCT Pub. Date: Feb. 4, 2016

(65) Prior Publication Data
US 2017/0170475 A1    Jun. 15, 2017

(30) Foreign Application Priority Data
Jul. 31, 2014 (JP) ................................. 2014-157041

(51) Int. Cl.
*H01M 4/52* (2010.01)
*H01M 4/36* (2006.01)
(Continued)

(52) U.S. Cl.
CPC ............. *H01M 4/525* (2013.01); *B01J 13/02* (2013.01); *C01G 51/42* (2013.01); *C01G 53/44* (2013.01);
(Continued)

(58) Field of Classification Search
None
See application file for complete search history.

(56) References Cited

U.S. PATENT DOCUMENTS

2008/0138708 A1  6/2008  Watanabe et al.
2009/0068561 A1  3/2009  Sun et al.
(Continued)

FOREIGN PATENT DOCUMENTS

| CN | 1897336 A | 1/2007 |
|----|-----------|--------|
| CN | 101192668 A | 6/2008 |

(Continued)

OTHER PUBLICATIONS

Office Action for CN Patent Application No. 201580040946.3, dated Nov. 28, 2018, 03 pages of Office Action.
(Continued)

*Primary Examiner* — Maria Laios
*Assistant Examiner* — Angela J Martin
(74) *Attorney, Agent, or Firm* — Chip Law Group

(57) ABSTRACT

A positive electrode active material includes: a composite particle that includes a particle containing a lithium transition metal composite oxide of Li and Co and a layer that is provided on a surface of the particle and includes an oxide of Li, Ni and Mn. Ni and Mn have a concentration distribution centered on the center from a surface of the composite particle, in a depth range in which a ratio d (%) satisfies $0.04\% \leq d \leq 0.20\%$, a mole fraction $r_n$ of Ni and a mole fraction $r_m$ of Mn are within ranges of $0.05 \leq r_n$ and $0.05 \leq r_m$, respectively, and a ratio $r_{n2}/r_{n1}$ and a ratio $r_{m2}/r_{m1}$
(Continued)

are within ranges of $0.85 \leq r_{n2}/r_{n1} \leq 1.0$ and $0.85 \leq r_{m2}/r_{m1} \leq 1.0$, respectively.

12 Claims, 13 Drawing Sheets

(51) Int. Cl.
    *H01M 4/50* (2010.01)
    *H01M 4/525* (2010.01)
    *H01M 4/505* (2010.01)
    *C01G 53/00* (2006.01)
    *B01J 13/02* (2006.01)
    *C01G 51/00* (2006.01)
    *H01M 10/052* (2010.01)
    *H01M 4/02* (2006.01)

(52) U.S. Cl.
    CPC ............ *C01G 53/50* (2013.01); *H01M 4/366* (2013.01); *H01M 4/505* (2013.01); *C01P 2004/10* (2013.01); *C01P 2004/20* (2013.01); *C01P 2004/30* (2013.01); *C01P 2004/32* (2013.01); *C01P 2004/61* (2013.01); *C01P 2004/84* (2013.01); *C01P 2006/12* (2013.01); *C01P 2006/40* (2013.01); *H01M 10/052* (2013.01); *H01M 2004/028* (2013.01); *Y02E 60/122* (2013.01)

(56) References Cited

U.S. PATENT DOCUMENTS

| | | |
|---|---|---|
| 2014/0131616 A1 | 5/2014 | Sun et al. |
| 2014/0154555 A1 | 6/2014 | Endoh et al. |
| 2015/0044513 A1 | 2/2015 | Endoh et al. |

FOREIGN PATENT DOCUMENTS

| | | | |
|---|---|---|---|
| CN | 102916171 A | 2/2013 | |
| CN | 103354958 A | 10/2013 | |
| CN | 103855422 A | 6/2014 | |
| CN | 103943854 A | 7/2014 | |
| CN | 104205434 A | 12/2014 | |
| EP | 2662914 A2 | 11/2013 | |
| JP | 2006-331940 A | 12/2006 | |
| JP | 2008-135279 A | 6/2008 | |
| JP | 2009-525578 A | 7/2009 | |
| JP | 2009-544565 A | 12/2009 | |
| JP | 2011-129498 A | 6/2011 | |
| JP | 2014-505334 A | 2/2014 | |
| JP | 2014-040363 A | 3/2014 | |
| JP | 2014-112476 A | 6/2014 | |
| JP | 2014112476 A * | 6/2014 | .......... H01M 10/052 |
| JP | 2015-015230 A | 1/2015 | |
| JP | 2015-069958 A | 4/2015 | |
| JP | 2015-082428 A | 4/2015 | |
| KR | 10-2007-0097923 A | 10/2007 | |
| KR | 10-2008-0048397 A | 6/2008 | |
| KR | 10-2012-0079801 A | 7/2012 | |
| KR | 10-2014-0138730 A | 12/2014 | |
| WO | 2007/114557 A1 | 10/2007 | |
| WO | 2012/093797 A2 | 7/2012 | |
| WO | 2013/145913 A1 | 10/2013 | |

OTHER PUBLICATIONS

Search Report of CN Patent Application No. 201580040946.3, dated Nov. 20, 2018, 03 pages.
International Search Report and Written Opinion of PCT Application No. PCT/JP2015/003376, dated Sep. 29, 2015, 9 pages of English Translation and 9 pages of ISRWO.
International Preliminary Report on Patentability of PCT Application No. PCT/JP2015/003376, dated Feb. 9, 2017, 9 pages of English Translation and 6 pages of IPRP.

* cited by examiner

POSITIVE ELECTRODE ACTIVE MATERIAL, POSITIVE ELECTRODE, BATTERY, BATTERY PACK, ELECTRONIC DEVICE, ELECTRIC VEHICLE, POWER STORAGE DEVICE, AND POWER SYSTEM

CROSS REFERENCE TO RELATED APPLICATIONS

This application is a U.S. National Phase of International Patent Application No. PCT/JP2015/003376 filed on Jul. 6, 2015, which claims priority benefit of Japanese Patent Application No. JP 2014-157041 filed in the Japan Patent Office on Jul. 31, 2014. Each of the above-referenced applications is hereby incorporated herein by reference in its entirety.

TECHNICAL FIELD

The present technology relates to a positive electrode active material and a positive electrode, a battery, a battery pack, an electronic device, an electric vehicle, a power storage device, and a power system including the same, and specifically, to a positive electrode active material including a lithium transition metal composite oxide.

BACKGROUND ART

In recent years, development of technologies for portable electronic devices has been remarkable, and electronic devices such as mobile phones and notebook computers have begun to be recognized as a fundamental technology that supports advanced information society. In addition, research and development of high functionality of such electronic devices have been actively conducted and power consumption of such electronic devices is also increasing in proportion to the high functionality. On the other hand, it is desirable for such electronic devices to be driven for a long time, and a high energy density is necessarily desired for a secondary battery serving as a driving power source. In addition, it is desirable to increase a cycle lifespan in consideration of environmental aspects.

In consideration of a volume and mass occupied by a battery that is built in an electronic device, a higher energy density of the battery is desirable. Currently, since lithium ion secondary batteries have higher voltages and more excellent energy densities than other battery systems, they are built in most devices.

In general, in a lithium ion secondary battery, lithium cobalt oxide is used in a positive electrode, a carbon material is used in a negative electrode, and an operating voltage in a range of 4.2 V to 2.5 V is used. In a single battery, excellent electrochemical stability of a non-aqueous electrolyte material and a separator has a great influence on increasing a terminal voltage to 4.2 V.

A great deal of research for obtaining higher performance and increasing applications of such lithium ion secondary batteries is proceeding. As one example, as a method of increasing a charging voltage, research on increasing an energy density of a positive electrode active material including lithium cobalt oxide and obtaining a high capacity of a lithium ion secondary battery is proceeding.

However, when charging and discharging are repeated at a high capacity, there is a problem of capacity deterioration and a battery lifespan being reduced. In addition, when a battery is used in a high temperature environment, there is a problem of a gas being generated inside the battery and leakage and battery deformation being caused. Therefore, in the related art, a method in which a small amount of $LiMn_{1/3}Co_{1/3}Ni_{1/3}O_2$ is mixed with a positive electrode active material, another material is used to cover a surface, and thus the positive electrode active material is modified has been performed.

In addition, in surface covering of the positive electrode active material, effects of cycle characteristic improvement and thermal stability improvement according to the form of covering have been studied. The following Patent Literature 1 discloses a positive electrode active material that includes a covering layer containing an oxide of Li, Ni, and Mn and in which a concentration of Mn in the covering layer is higher in an outer layer portion than an inner layer portion.

In addition, the following Patent Literature 2 discloses an influence of a concentration of Mn in a material covered with modified $LiCoO_2$ and a covering layer that includes Ni and Mn.

In addition, in the following Patent Literature 3, states of Co and Mg in a covering layer are defined.

CITATION LIST

Patent Literature

Patent Literature 1 JP 2006-331940A
Patent Literature 2 JP 2009-544565T
Patent Literature 3 JP 2011-129498A

DISCLOSURE OF INVENTION

Technical Problem

While various methods of covering surfaces with various LiCo oxides have been disclosed, improvement of a filling ability and a cycle characteristic, and a high-temperature preservation characteristic are insufficient depending on diffusion states of such transition metals.

In Patent Literature 1, concentrations of Ni and Mn in the covering layer in a depth direction are not defined, and an effect thereof is limited to an increase of a discharge capacity and improvement of a cycle characteristic.

Patent Literature 2 discloses that, according to $Li_1M'O_2$, a second phase in which M' is Mn, Ni, or Co is included, there are regions of low Mn content and high Mn content, and in this case, the region of high Mn content is positioned in an island on a surface, an effect is limited to only a difference of a concentration of Mn in the covering layer, and a relation of a concentration distribution in particles is not disclosed.

In Patent Literature 3, states of Co and Mg in a covering layer are defined, but only a limited composition of the outermost surface is provided, and a relation of Ni and Mn with Co is not defined.

Therefore, an object of the present technology is to provide a positive electrode active material having a high capacity, an excellent cycle characteristic and a high-temperature preservation characteristic, and a positive electrode, a battery, a battery pack, an electronic device, an electric vehicle, a power storage device, and a power system including the same.

Solution to Problem

In order to solve the problem, a first technology is a positive electrode active material including: a composite particle that includes a particle containing a lithium transition metal composite oxide of Li and Co and a layer that is provided on a surface of the particle and includes an oxide of Li, Ni and Mn. Ni and Mn have a concentration distribution centered on the center from a surface of the composite particle, in a depth range in which a ratio d (%) satisfies 0.04%≤d≤0.20%, a mole fraction $r_n$ of Ni and a mole fraction $r_m$ of Mn are within ranges of 0.05≤$r_n$ and 0.05≤$r_m$, respectively, and when the mole fractions $r_n$ and $r_m$ of Ni and Mn in a depth in which the ratio d (%) satisfies d=0.04% are set as $r_{n1}$ and $r_{m1}$, respectively, and the mole fractions $r_n$ and $r_m$ of Ni and Mn in a depth in which the ratio d (%) satisfies d=0.20% are set as $r_{n2}$ and $r_{m2}$, respectively, a ratio $r_{n2}/r_{n1}$ and a ratio $r_{m2}/r_{m1}$ are within ranges of 0.85≤$r_{n2}/r_{n1}$≤1.0 and 0.85≤$r_{m2}/r_{m1}$≤1.0, respectively (where the ratio d (%)=[((mass of Co)+(mass of Ni)+(mass of Mn))/(total mass of composite particles)]×100; the mole fraction $r_n$ of Ni=(amount of substance of Ni)/((amount of substance of Co)+(amount of substance of Ni)+(amount of substance of Mn)); the mole fraction $r_m$=(amount of substance of Mn)/((amount of substance of Co)+(amount of substance of Ni)+(amount of substance of Mn))).

A second technology is a positive electrode including: a positive electrode active material that includes a composite particle including a particle containing a lithium transition metal composite oxide of Li and Co and a layer that is provided on a surface of the particle and includes an oxide of Li, Ni and Mn. Ni and Mn have a concentration distribution centered on the center from a surface of the composite particle, in a depth range in which a ratio d (%) satisfies 0.04%≤d≤0.20%, a mole fraction $r_n$ of Ni and a mole fraction $r_m$ of Mn are within ranges of 0.05≤$r_n$ and 0.05≤$r_m$, respectively, and when the mole fractions $r_n$ and $r_m$ of Ni and Mn in a depth in which the ratio d (%) satisfies d=0.04% are set as $r_{n1}$ and $r_{m1}$, respectively, and the mole fractions $r_n$ and $r_m$ of Ni and Mn in a depth in which the ratio d (%) satisfies d=0.20% are set as $r_{n2}$ and $r_{m2}$, respectively, a ratio $r_{n2}/r_{n1}$ and a ratio $r_{m2}/r_{m1}$ are within ranges of 0.85≤$r_{n2}/r_{n1}$≤1.0 and 0.85≤$r_{m2}/r_{m1}$≤1.0, respectively (where the ratio d (%)=[((mass of Co)+(mass of Ni)+(mass of Mn))/(total mass of composite particles)]×100; the mole fraction $r_n$ of Ni=(amount of substance of Ni)/((amount of substance of Co)+(amount of substance of Ni)+(amount of substance of Mn)); the mole fraction $r_m$=(amount of substance of Mn)/((amount of substance of Co)+(amount of substance of Ni)+(amount of substance of Mn))).

A third technology is a battery including: a positive electrode including a positive electrode active material; a negative electrode; and an electrolyte. The positive electrode active material includes a composite particle that includes a particle containing a lithium transition metal composite oxide of Li and Co and a layer that is provided on a surface of the particle and includes an oxide of Li, Ni and Mn, Ni and Mn have a concentration distribution centered on the center from a surface of the composite particle, in a depth range in which a ratio d (%) satisfies 0.04%≤d≤0.20%, a mole fraction $r_n$ of Ni and a mole fraction $r_m$ of Mn are within ranges of 0.05≤$r_n$ and 0.05≤$r_m$, respectively, and when the mole fractions $r_n$ and $r_m$ of Ni and Mn in a depth in which the ratio d (%) satisfies d=0.04% are set as $r_{n1}$ and $r_{m1}$, respectively, and the mole fractions $r_n$ and $r_m$ of Ni and Mn in a depth in which the ratio d (%) satisfies d=0.20% are set as $r_{n2}$ and $r_{m2}$, respectively, a ratio $r_{n2}/r_{n1}$ and a ratio $r_{m2}/r_{m1}$ are within ranges of 0.85≤$r_{n2}/r_{n1}$≤1.0 and 0.85≤$r_{m2}/r_{m1}$≤1.0, respectively (where the ratio d (%)=[((mass of Co)+(mass of Ni)+(mass of Mn))/(total mass of composite particles)]×100; the mole fraction $r_n$ of Ni=(amount of substance of Ni)/((amount of substance of Co)+(amount of substance of Ni)+(amount of substance of Mn)); the mole fraction $r_m$=(amount of substance of Mn)/((amount of substance of Co)+(amount of substance of Ni)+(amount of substance of Mn))).

A fourth technology is a battery pack including: the battery according to the third technology.

A fifth technology is an electronic device including: the battery according to the third technology. The electronic device receives power supply from the battery.

A sixth technology is an electric vehicle including: the battery according to the third technology; a conversion device configured to perform conversion into driving power of the vehicle upon reception of power supply from the battery; and a control device configured to perform information processing regarding vehicle control based on information regarding the battery.

A seventh technology is a power storage device including: the battery according to the third technology. The power storage device supplies power to an electronic device connected to the battery.

An eighth technology is a power system including: the battery according to the third technology. The power system receives power supply from the battery, or allows power to be supplied to the battery from a power generation apparatus or a power network.

Advantageous Effects of Invention

As described above, according to the present technology, it is possible to obtain a high capacity, an excellent cycle characteristic and a high-temperature preservation characteristic.

MODE(S) FOR CARRYING OUT THE INVENTION

Embodiments of the present technology will be described in the following order.
1. First embodiment (example of positive electrode active material)
2. Second embodiment (example of cylindrical battery)
3. Third embodiment (example of flat battery)
4. Fourth embodiment (example of stacked battery)
5. Fifth embodiment (examples of battery pack and electronic device)
6. Sixth embodiment (example of power storage system)
7. Seventh embodiment (example of electric vehicle)

1. First Embodiment

[Configuration of Positive Electrode Active Material]

A positive electrode active material according to a first embodiment of the present technology includes surface-covered composite particle powder. The positive electrode active material may further include other particle powders in addition to the surface-covered composite particle powder as necessary. A plurality of surface-covered composite particles may aggregate to form secondary particles.

Figure 1:
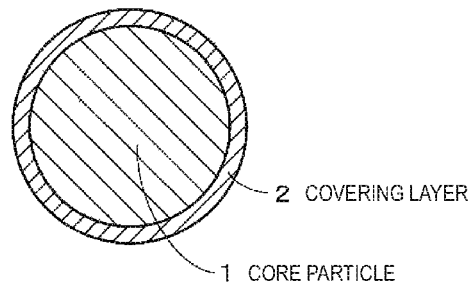
FIG. 1 is a pattern diagram showing a configuration example of a positive electrode active material according to a first embodiment of the present technology.

As shown in FIG. 1, a surface-covered composite particle includes a core particle 1 and a covering layer 2 that is provided on a surface of the core particle 1. An average particle size of the surface-covered composite particle is preferably in a range of 2.0 μm or more and 50 μm or less.
(Core Particle)

The core particle 1 includes, for example, a globe form, an ellipsoid form, a needle form, a plate form, a scale form, a tube form, a wire form, a stick form (rod form), an indeterminate form and the like, whereas they are not limited to these particularly. In addition, two or more kinds of particles with the above-mentioned forms may be combined to be used. Herein, the globe form includes not only a spherical form but also a form which is slightly flat or distorted compared with the strict spherical form, a form which is obtained by forming unevenness on the surface of the strict spherical form, a form obtained by combining any of these forms, and the like. The ellipsoid form includes not only a strict ellipsoid form but also a form which is slightly flat or distorted compared with the strict ellipsoid form, a form which is obtained by forming unevenness on the surface of the strict ellipsoid form, a form obtained by combining any of these forms, and the like.

The core particle 1 includes a lithium composite oxide. The lithium composite oxide is a positive electrode material that can intercalate and deintercalate lithium. As such a positive electrode material, in order to increase an energy density, a lithium transition metal composite oxide including lithium, cobalt, and oxygen is preferable. The lithium transition metal composite oxide may further include one or two or more transition metal elements other than cobalt. As the lithium transition metal composite oxide, a lithium transition metal composite oxide using a Li insertion and separation reaction necessary for crystalline phase transition is preferably used. This is because an effect which enables a cycle characteristic to be improved is particularly noticeably exhibited. As the lithium transition metal composite oxide that uses a Li insertion and separation reaction, a lithium transition metal composite oxide having a layered rock salt structure is preferably used. This is because it can increase a chargeable and dischargeable capacity by increasing a charging voltage.

As the lithium composite oxide having a layered rock salt structure, for example, a lithium composite oxide having an average composition represented by the following expression (A) is used.

$$Li_xCo_{1-y}M_yO_{2-z} \qquad (A)$$

(Here, M is at least one of Mg, Al, B, Ti, V, Cr, Fe, Cu, Zn, Mo, Sn, W, Zr, Y, Nb, Ca, Sr, Bi, Na, K, Si, P, Mn, and Ni. x is $0 \leq x \leq 1.0$, y is $0 \leq y \leq 0.50$, and z is $-0.10 \leq z \leq 0.20$.)
(Covering Layer)

The covering layer 2 covers at least a part of a surface of the core particle 1. Specifically, the covering layer 2 may partially cover the surface of the core particle 1 or may cover the entire surface of the core particle 1. However, in order to improve a cycle characteristic and a high-temperature preservation characteristic, the entire surface of the core particle 1 is preferably covered. At an interface between the core particle 1 and the covering layer 2, compositions and states of both components may be discontinuously changed or continuously changed.

The covering layer 2 includes an oxide of Li, Ni and Mn. The covering layer 2 may further include an oxide that contains at least one selected from among the group including Mg, Al, B, P, Si, Ti, V, Cr, Fe, Co, Cu, Zn, Mo, Sn, W, Zr, Y, Nb, Ca and Sr as necessary. The covering layer 2 further includes Co that is diffused from the core particle 1. On the other hand, the core particle 1 further includes Ni and Mn that are diffused from the covering layer 2. A ratio of the covering layer 2 with respect to the surface-covered composite particle is preferably in a range of 0.1 mass % or more and 50 mass % or less.
(Concentration Distribution)

Ni and Mn have a concentration distribution centered on the center from a surface of the composite particle. A mole fraction $r_n$ of Ni and a mole fraction $r_m$ of Mn preferably decrease from a surface of the surface-covered composite particle toward the center (a depth direction).

In a depth range in which a ratio d (%) satisfies $0.04\% \leq d \leq 0.20\%$, the mole fraction $r_n$ and the mole fraction $r_m$ are within ranges of $0.05 \leq r_n$ and $0.05 \leq r_m$, and preferably $0.05 \leq r_n \leq 0.10$ and $0.05 \leq r_m \leq 0.10$. When the mole fractions $r_n$ and $r_m$ of Ni and Mn in a depth in which a ratio d (%) satisfies d=0.04% are set as $r_{n1}$ and $r_{m1}$, respectively, and the mole fractions $r_n$ and $r_m$ of Ni and Mn in a depth in which a ratio d (%) satisfies d=0.20% are set as $r_{n2}$ and $r_{m2}$, respectively, a ratio $r_{n2}/r_{n1}$ and a ratio $r_{m2}/r_{m1}$ are within ranges of $0.85 \leq r_{n2}/r_{n1} \leq 1.0$ and $0.85 \leq r_{m2}/r_{m1} \leq 1.0$, respectively. In addition, a depth in which d=0.20% is satisfied is preferably deeper than an interface of the core particle 1 and the covering layer 2.

However, the ratio d (%), the mole fraction $r_n$, and the mole fraction $r_m$ are represented by the following expressions (1) to (3).

$$\text{ratio } d\ (\%) = [((\text{mass of Co}) + (\text{mass of Ni}) + (\text{mass of Mn}))/(\text{total mass of composite particles})] \times 100. \quad (1)$$

$$\text{mole fraction } r_n \text{ of Ni} = (\text{amount of substance of Ni})/((\text{amount of substance of Co}) + (\text{amount of substance of Ni}) + (\text{amount of substance of Mn})) \quad (2)$$

$$\text{mole fraction } r_m \text{ of Mn} = (\text{amount of substance of Mn})/((\text{amount of substance of Co}) + (\text{amount of substance of Ni}) + (\text{amount of substance of Mn})) \quad (3)$$

Here, the term "mass of Co" refers to a mass [g] of Co that is included to a predetermined depth from a surface of the composite particle. The term "mass of Ni" refers to a mass [g] of Ni that is included to a predetermined depth from a surface of the composite particle. The term "mass of Mn" refers to a mass [g] of Mn that is included to a predetermined depth from a surface of the composite particle. In addition, the term "amount of substance of Co" refers to an amount [mol] of substance of Co that is included to a predetermined depth from a surface of the composite particle. The term "amount of substance of Ni" refers to an amount [mol] of substance of Ni that is included to a predetermined depth from a surface of the composite particle. The term "amount of substance of Mn" refers to an amount [mol] of substance of Mn that is included to a predetermined depth from a surface of the composite particle.

Masses of Co, Ni and Mn are obtained when a surface of the surface-covered composite particle is dissolved with hydrochloric acid and contents of Co, Ni and Mn are obtained by mass spectrometry. Amounts of substances of Co, Ni and Mn are calculated using the masses of Co, Ni and Mn determined as described above.

[Method of Manufacturing Positive Electrode Active Material]

First, particle powder including a lithium transition metal composite oxide is prepared as core particle powder. Next, the powder is stirred and dispersed in a lithium hydroxide (LiOH) aqueous solution. Next, a solution in which manganese nitrate ($Mn(NO_3)_2 \cdot 6H_2O$) and nickel nitrate (Ni$(NO_3)_2 \cdot 6H_2O$) are dissolved in pure water is added to the dispersed solution, then continuously stirred and dispersed, and cooled. Next, the dispersed system is filtered and dried to obtain a precursor. The precursor sample is impregnated into a lithium carbonate ($Li_2CO_3$) aqueous solution in order to adjust an amount of lithium, and uniformly mixed and dried, and a calcination precursor is obtained. Next, the calcination precursor is heated and left at a predetermined temperature for a predetermined time, and is then cooled. Accordingly, a covering layer including an oxide of Li, Ni and Mn is formed on a surface of the core particle. Thus, a target positive electrode active material is obtained.

[Effects]

According to the positive electrode active material of the first embodiment, in a depth range in which a ratio d (%) satisfies $0.04\% \leq d \leq 0.20\%$, a mole fraction $r_n$ and a mole fraction $r_m$ are within ranges of $0.05 \leq r_n$ and $0.05 \leq r_m$. In addition, a ratio $r_{n2}/r_{n1}$ and a ratio $r_{m2}/r_{m1}$ are within ranges of $0.85 \leq r_{n2}/r_{n1} \leq 1.0$ and $0.85 \leq r_{m2}/r_{m1} \leq 1.0$, respectively. When a battery is produced using the positive electrode active material having such a configuration, it is possible to obtain a high capacity, an excellent cycle characteristic and a high-temperature preservation characteristic.

2. Second Embodiment

[Configuration of Battery]

Figure 2:
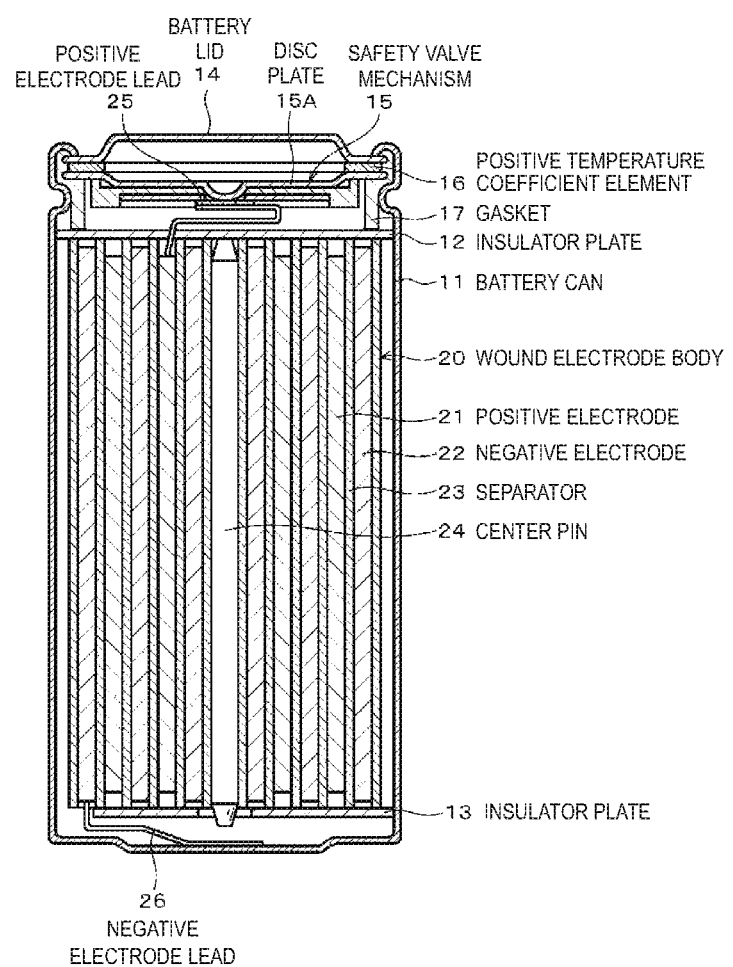
FIG. 2 is a cross-sectional view showing a configuration example of a non-aqueous electrolyte secondary battery according to a second embodiment of the present technology.

Hereinafter, a configuration example of a non-aqueous electrolyte secondary battery according to a second embodiment of the present technology will be described with reference to FIG. 2. The non-aqueous electrolyte secondary battery is a so-called lithium ion secondary battery, for example, for which the capacity of its negative electrode is represented by a capacity component based on intercalation and deintercalation of lithium (Li) which is an electrode reaction substance. The non-aqueous electrolyte secondary battery is of a so-called cylinder type and has, inside a battery can 11 which is hollow and substantially columnar, a wound electrode body 20 obtained by winding a pair of a belt-shaped positive electrode 21 and a belt-shaped negative electrode 22 which are layered to interpose a separator 23. The battery can 11 is configured of iron (Fe) plated with nickel (Ni), one end part thereof is closed and the other end part is opened. The electrolyte solution is injected into the battery can 11 as an electrolyte, and is impregnated into the positive electrode 21, the negative electrode 22 and the separator 23. Moreover, a pair of insulator plates 12 and 13 are disposed perpendicular to the circumferential surface of winding to interpose the wound electrode body 20.

To the opening end part of the battery can 11, a battery lid 14, a safety valve mechanism 15 provided in the battery lid 14, and a positive temperature coefficient (PTC) element 16 are attached by swaging via an opening sealing gasket 17. Thereby, the inside of the battery can 11 is sealed. The battery lid 14 is configured, for example, of a material similar to that of the battery can 11. The safety valve mechanism 15 is electrically connected to the battery lid 14 and on the occasion that the inner pressure of the battery is not less than a certain value due to internal short, heating from the outside or the like, a disc plate 15A is configured to reverse so as to cut the electric connection between the battery lid 14 and the wound electrode body 20. The opening sealing gasket 17 is configured, for example, of insulative material and its surface is applied with asphalt.

Through the center of the wound electrode body 20, for example, a center pin 24 is inserted. A positive electrode lead 25 made of aluminum (Al) or the like is connected to a positive electrode 21 of the wound electrode body 20, and a negative electrode lead 26 made of nickel or the like is connected to a negative electrode 22. The positive electrode lead 25 is welded to the safety valve mechanism 15 to be electrically connected to the battery lid 14, and the negative electrode lead 26 is welded to the battery can 11 to be electrically connected thereto.

In the non-aqueous electrolyte secondary battery according to the second embodiment, an open circuit voltage (that is, a battery voltage) in a completely charged state for each pair of the positive electrode 21 and the negative electrode 22 may be 4.2 V or less, or may be designed to be within a range that is higher than 4.2 V, preferably 4.3 V or more and 5.0 V or less, and more preferably 4.35 V or more and 4.60 V or less. When the battery voltage is set within such a range, it is possible to obtain a high energy density and an effect of improving a cycle characteristic is noticeably exhibited.

Figure 3:
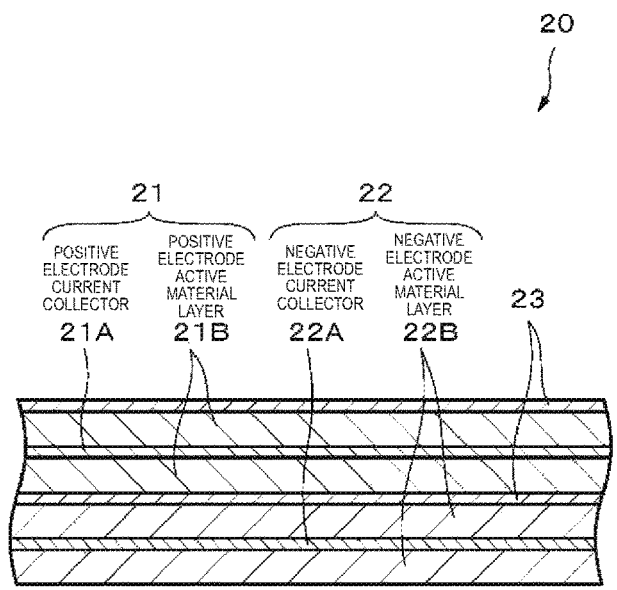
FIG. 3 is a cross-sectional view showing an enlarged part of a wound electrode body shown in FIG. 2.

The positive electrode 21, the negative electrode 22, the separator 23, and the electrolyte solution of the non-aqueous electrolyte secondary battery will be sequentially described below with reference to FIG. 3.

(Positive Electrode)

The positive electrode 21 has, for example, a structure in which a positive electrode active material layer 21B is provided on both sides of a positive electrode current collector 21A. In addition, although not shown, the positive electrode active material layer 21B may be provided only on one side of the positive electrode current collector 21A. The positive electrode current collector 21A is made of metal foil, for example, aluminum foil, nickel foil, or stainless steel foil. The positive electrode active material layer 21B includes a positive electrode active material that can intercalate and deintercalate, for example, lithium (Li) serving as an electrode reactant. The positive electrode active material layer 21B may further include an additive as necessary. As the additive, for example, at least one of a conductive material and a binder can be used.

(Positive Electrode Active Material)

As a positive electrode active material, the positive electrode active material according to the first embodiment is used.

(Binder)

As a binding material, at least one selected from among, for example, resin materials such as polyvinylidene fluoride (PVdF), polytetrafluoroethylene (PTFE), polyacrylonitrile (PAN), styrene butadiene rubber (SBR), and carboxymethylcellulose (CMC), and a copolymer including such a resin material as a main component is used.

(Conductive Material)

As the conductive material, for example, a carbon material such as graphite, carbon black or Ketjen black is used, and one or two or more thereof are used in combination. In addition, any metal material or conductive polymer material that is a material having conductivity may be used in addition to the carbon material.

(Negative Electrode)

The negative electrode 22 has, for example, a structure in which negative electrode active material layers 22B are provided on the both sides of a negative electrode current collector 22A. In addition, the negative electrode active material layer 22B may be provided only on one side of the negative electrode current collector 22A, this not shown in any figure. The negative electrode current collector 22A is made of metal foil, for example, copper foil, nickel foil or stainless steel foil.

The negative electrode active material layer 22B includes one or two or more negative electrode active materials that can intercalate and deintercalate lithium as a negative electrode active material. The negative electrode active material layer 22B may further include an additive such as a binder as necessary.

In addition, in the non-aqueous electrolyte secondary battery according to the second embodiment, an electrochemical equivalent of a negative electrode material that can intercalate and deintercalate lithium is greater than an electrochemical equivalent of the positive electrode 21, and a lithium metal is not precipitated in the negative electrode 22 during charging.

As the negative electrode material that can intercalate and deintercalate lithium, a material that can intercalate and deintercalate, for example, lithium, and includes at least one of a metal element and a metalloid element as a constituent element is used. Here, the negative electrode 22 including such a negative electrode material is referred to as an alloy-based negative electrode. This is because a high energy density can be obtained with use of such a material. Such a material is preferably used together with carbon material because the high energy density and also excellent cycling characteristics can be obtained. The negative electrode material may be a simple substance, an alloy, or a compound of the metal element or the semi-metal element, or may contain, at least partly, a phase of one or more of the simple substance, alloy, or compound of the metal element or the semi-metal element. Note that in the present disclosure, the alloy includes a material formed with two or more kinds of metal elements and a material containing one or more kinds of metal elements and one or more kinds of semi-metal elements. Further, the alloy may contain a non-metal element. Examples of its texture include a solid solution, a eutectic (eutectic mixture), an intermetallic compound, and one in which two or more kinds thereof coexist.

Examples of the metal element or semi-metal element contained in this negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd), and platinum (Pt). These materials may be crystalline or amorphous.

It is preferable to use, as the negative electrode active material, for example, a material containing, as a constituent element, a metal element or a semi-metal element of 4B group in the short periodical table. It is more preferable to use a material containing at least one of silicon (Si) and tin (Sn) as a constituent element. This is because silicon (Si) and tin (Sn) each have a high capability of intercalating and deintercalating lithium (Li), so that a high energy density can be obtained.

Examples of the alloy of tin (Sn) include alloys containing, as a second constituent element other than tin (Sn), at least one selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr). Examples of the alloy of silicon (Si) include alloys containing, as a second constituent element other than silicon (Si), at least one selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

Examples of the compound of tin (Sn) or the compound of silicon (Si) include compounds containing oxygen (O) or carbon (C), which may contain any of the above-described second constituent elements in addition to tin (Sn) or silicon (Si). Specific examples of a compound of tin (Sn) include a silicon oxide represented by $SiO_v$ ($0.2<v<1.4$).

Examples of the negative electrode material capable of intercalating and deintercalating lithium include, for example, carbon materials such as hardly graphitizable carbon, easily graphitizable carbon, graphite, thermally degraded carbons, cokes, glassy carbons, fired bodies of organic polymers, carbon fiber and activated carbon. As the graphite, natural graphite that has undergone a spheroidizing treatment or artificial graphite having a substantially spherical shape is preferably used. As the artificial graphite, artificial graphite obtained by graphitizing mesocarbon microbeads (MCMBs) or artificial graphite obtained by graphitizing and pulverizing a coke raw material is preferable. Among these, the cokes include pitch cokes, needle cokes, petroleum cokes and the like. The fired bodies of organic polymers are carbons obtained by firing polymer materials such as phenol resin and furan resin at an appropriate temperature, and some of these are categorized as hardly graphitizable carbon or easily graphitizable carbon.

Moreover, the polymer materials include polyacetylene, polypyrrole and the like. These carbon materials are preferable for which change in crystal structure arising in charging or discharging is exceedingly small and which can attain high charge/discharge capacity and favorable cycle characteristics. Particularly, graphite is preferable which has a large electrochemical equivalent and can attain high energy density. Moreover, hardly graphitizable carbon is preferable which can attain excellent characteristics. Furthermore, one which is low in charge/discharge potential, specifically, close to lithium metal in charge/discharge potential is preferable since it can easily realize high energy density of the battery.

As the negative electrode material that can intercalate and deintercalate lithium, other metal compounds or polymer materials may be additionally exemplified. Examples of other metal compounds include an oxide such as $MnO_2$, $V_2O_5$, and $V_6O_{13}$, a sulfide such as NiS and MoS, or a lithium nitride such as $LiN_3$. Examples of the polymer materials include polyacetylene, polyaniline, and polypyrrole.

Generally, a carbon material is used as the negative electrode active material of the lithium ion secondary battery. Due to multifunctionality of recent electronic devices, power consumption is significantly increasing, and high capacity secondary batteries are being increasingly demanded. However, it will be difficult to satisfy such needs in the near future simply using carbon materials. Therefore, negative electrode active materials including Sn-based materials or Si-based materials that are materials having higher capacities than carbon materials are being actively developed. However, generally, the negative electrode active materials including Sn-based materials or Si-based materials have a high irreversible capacity during first charging. Accordingly, in order to utilize a high capacity characteristic of the negative electrode active material, the negative electrode active material is preferably used in combination with a positive electrode active material having a high capacity and a suitable irreversible capacity. As the positive electrode active material, the above-described positive electrode active material including a first positive electrode active material and a second positive electrode active material is appropriate. That is, a negative electrode active material including at least one of silicon (Si) and tin (Sn) and the above-described positive electrode active material including a first positive electrode active material and a second positive electrode active material are preferably used in combination.

(Binder)

As the binder, at least one selected from among, for example, resin materials such as polyvinylidene fluoride (PVdF), polytetrafluoroethylene (PTFE), polyacrylonitrile (PAN), styrene butadiene rubber (SBR), and carboxymethylcellulose (CMC), and a copolymer including such a resin material as a main component is used.

(Separator)

The separator 23 separates the positive electrode 21 and the negative electrode 22, prevents a current short circuit due to contact of both electrodes, and allows lithium ions to pass. The separator 23 includes, for example, a porous membrane made of a synthetic resin including polytetrafluoroethylene, polypropylene or polyethylene or a porous membrane made of a ceramic, and may have a structure in which two or more of such porous membranes are laminated. Among these, a porous membrane made of a polyolefin is preferable because it has an excellent short circuit preventing effect and can improve safety of a battery according to a shutdown effect.

In particular, the polyethylene is preferable as a material of the separator 23 because it can have a shutdown effect in a range of 100° C. or higher and 160° C. or lower and has excellent electrochemical stability. In addition, the polypropylene is preferable. Also, as long as a resin has chemical stability, it can be used in copolymerization or blending with polyethylene or polypropylene.

(Electrolyte Solution)

The separator 23 is impregnated with an electrolyte solution which is electrolyte in a liquid form. The electrolyte solution contains a solvent and an electrolyte salt dissolved in the solvent. In order to improve a battery characteristic, the electrolyte solution may include a known additive.

As the solvent, a cyclic carbonate such as ethylene carbonate and propylene carbonate can be used and it is preferable to use one of ethylene carbonate and propylene carbonate, particularly, a mixture of both. This is because cycle characteristics can be improved.

In addition to these cyclic carbonates, as the solvent, an open-chain carbonate such as diethyl carbonate, dimethyl carbonate, ethyl methyl carbonate and methyl propyl carbonate is preferable to be used as a mixture with those. This is because high ion conductivity can be attained.

Furthermore, the solvent is preferable to contain 2,4-difluoroanisole and/or vinylene carbonate. This is because 2,4-difluoroanisole can improve discharge capacity and vinylene carbonate can improve cycle characteristics. Accordingly, mixing these to be used is preferable since the discharge capacity and the cycle characteristics can be improved.

Other than these, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate.

In addition, a compound obtained by substituting fluorine for at least part of hydrogen of any of these non-aqueous solvents is sometimes preferable since reversibility of the electrode reaction can be sometimes improved depending on kinds of electrodes used as a combination.

Examples of the electrolyte salt include, for example, lithium salts, one kind of them may be used solely and two or more kinds of them may be mixed to be used. Examples of the lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, LiCl, lithium difluoro[oxolato-O,O']borate, lithium bisoxalatoborate, and LiBr. Above all, $LiPF_6$ is preferable to be able to attain high ion conductivity and improve cycle characteristics.

In the non-aqueous electrolyte secondary battery having the above-described configuration, when charging is performed, for example, lithium ions are deintercalated from the positive electrode active material layer 21B, and intercalated into the negative electrode active material layer 22B through the electrolyte solution. In addition, when discharging is performed, for example, lithium ions are deintercalated from the negative electrode active material layer 22B and intercalated into the positive electrode active material layer 21B through the electrolyte solution.

[Method of Manufacturing Battery]

The following will show an example of a method for manufacturing the nonaqueous electrolyte secondary battery according the second embodiment of the present technology.

First, for example, a positive electrode mixture is prepared by mixing the positive electrode active material, a conductive material, and a binder, and a paste-form positive electrode mixture slurry is prepared by dispersing the positive electrode mixture into a solvent such as N-methyl-2-pyrrolidinone. Next, the positive electrode mixture slurry is applied on the positive electrode current collector 21A, the solvent is dried, and the dried mixture is compression molded with a rolling press machine or the like, so that the positive electrode active material layer 21B is formed and the positive electrode 21 is produced.

Further, for example, a negative electrode mixture is prepared by mixing a negative electrode active material and a binder, and a paste-form negative electrode mixture slurry is prepared by dispersing this negative electrode mixture in a solvent such as N-methyl-2-pyrrolidone. Next, the negative electrode mixture slurry is applied on the negative electrode current collector 22A, the solvent is dried, and the dried mixture is compression molded with a rolling press machine or the like, so that the negative electrode active material layer 22B is formed and the negative electrode 22 is produced.

Next, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are wound via the separator 23. Next, the tip part of the positive electrode lead 25 is welded to the safety valve mechanism 15, the tip part of the negative electrode lead 26 is welded to the battery can 11, and the wound positive electrode 21 and negative electrode 22 are interposed between the pair of insulator plates 12 and 13 and are contained inside the battery can 11. Next, after the positive electrode 21 and the negative electrode 22 are contained inside the battery can 11, the electrolyte solution is injected into the battery can 11 to impregnate the separator 23. Next, the battery lid 14, the safety valve mechanism 15 and the positive temperature coefficient element 16 are fixed to the opening end part of the battery can 11 by swaging via the opening sealing gasket 17. Thereby, the secondary battery shown in FIG. 3 is obtained.

3. Third Embodiment

[Configuration of Battery]

Figure 4:
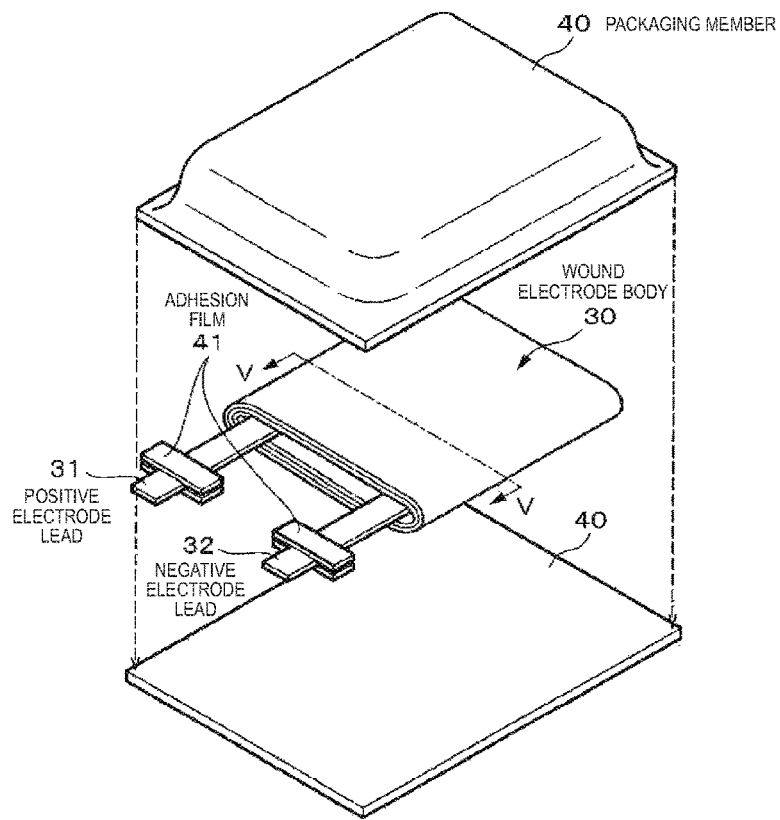
FIG. 4 is an exploded perspective view showing a configuration example of a non-aqueous electrolyte secondary battery according to a third embodiment of the present technology.

FIG. 4 is an exploded perspective view showing a configuration example of a non-aqueous electrolyte secondary battery according to a third embodiment of the present technology. The non-aqueous electrolyte secondary battery is a so-called flat battery in which a wound electrode body 30 to which a positive electrode lead 31 and a negative electrode lead 32 are attached is accommodated inside a film-like packaging member 40, and enables a small, lightweight and thin battery to be implemented.

Each of the positive electrode lead 31 and the negative electrode lead 32 is led out from the inside of the packaging member 40 toward the outside in the same direction, for example. The positive electrode lead 31 and the negative electrode lead 32 are each formed using, for example, a metal material such as aluminum, copper, nickel, or stainless steel, in a thin plate state or a network state.

Each of the packaging members 40 is configured, for example, of a rectangular aluminum laminate film obtained by pasting a nylon film, an aluminum foil and a polyethylene film in this order. Each of the packaging members 40 is disposed, for example, such that the polyethylene film side thereof faces the wound electrode body 30, and their outer edge parts adhere to each other by fusion or with an adhesive. Adhesion films 41 are inserted between the packaging members 40 and the positive electrode lead 31 and negative electrode lead 32 to prevent intrusion of the air. The adhesion film 41 is configured of a material having adherence with respect to the positive electrode lead 31 and the negative electrode lead 32, which material is, for example, polyolefin resin such as polyethylene, polypropylene, modified polyethelene and modified polypropylene.

Note that the metal layer of the packaging member 40 may also be formed using a laminated film having another lamination structure, or a polymer film such as polypropylene or a metal film, instead of the above-described aluminum laminated film.

Figure 5:
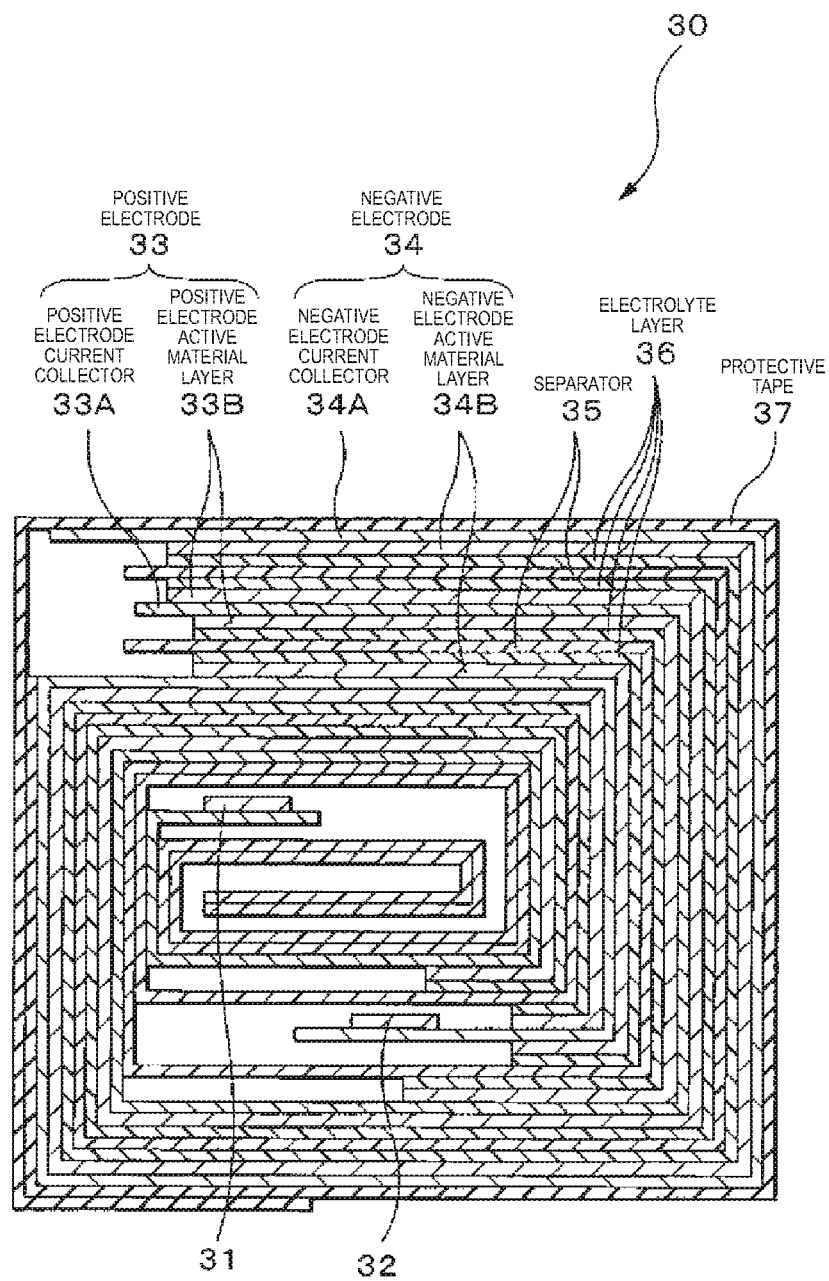
FIG. 5 is a cross-sectional view of a wound electrode body along a V-V line in FIG. 4.

FIG. 5 shows a cross-sectional structure along a V-V line of the wound electrode body 30 shown in FIG. 4. This wound electrode body 30 is prepared by laminating a positive electrode 33 and a negative electrode 34 with a separator 35 and an electrolyte layer 36 interposed therebetween and winding the laminate, and an outermost peripheral portion thereof is protected by a protective tape 37.

The positive electrode 33 has a structure in which positive electrode active material layers 33B are provided on one side or both sides of the positive electrode current collector 33A. The negative electrode 34 has a structure in which negative electrode active material layers 34B are provided on one side or both sides of the negative electrode current collector 34A, and the negative electrode active material layer 34B is disposed so as to face the positive electrode active material layer 33B. The configurations of the positive electrode current collector 33A, the positive electrode active material layer 33B, the negative electrode current collector 34A, the negative electrode active material layer 34B and the separator 35 are similar to those of the positive electrode current collector 21A, the positive electrode active material layer 21B, the negative electrode current collector 22A, the negative electrode active material layer 22B and the separator 23 in the second embodiment, respectively.

The electrolyte layer 36 contains an electrolyte solution and a polymer compound which is a retention body retaining the electrolyte solution, and is in a so-called gel form. The gel-form electrolyte layer 36 is preferable to be able to attain high ion conductivity and prevent leakage in the battery. The composition of the electrolyte solution is similar to that of the secondary battery according to the second embodiment. Examples of the polymer compound include, for example, polyacrilonitrile, polyvinylidene fluoride, copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. Particularly, in view of electrochemical stability, polyacrilonitrile, polyvinylidene fluoride, polyhexafluoropropylene or polyethylene oxide is preferable.

[Method of Manufacturing Battery]

The following will show an example of a method for manufacturing the nonaqueous electrolyte secondary battery according the third embodiment of the present technology.

A precursor solution including a solvent, an electrolyte salt, a polymer compound, and a mixed solvent is applied on surfaces of each of the positive electrode 33 and the negative electrode 34, and the mixed solvent is then volatilized to form the electrolyte layer 36. Subsequently, the positive electrode 33 and the negative electrode 34 each having the electrolyte layer 36 formed thereon are laminated with the separator 35 interposed therebetween to form a laminate, and then the laminate is wound in a longitudinal direction thereof and the protective tape 37 is adhered to an outermost peripheral portion to form the wound electrode body 30. Finally, for example, the wound electrode body 30 is interposed between the packaging members 40, and the outer periphery portions of the packaging members 40 are adhered to each other by means of heat fusion or the like, thereby enclosing the wound electrode body 30 therein. On that occasion, the contact film 41 is inserted between each of the positive electrode lead 31 and the negative electrode lead 32 and the packaging member 40. There is thus obtained a secondary battery shown in FIGS. 4 and 5.

Alternatively, the secondary battery may be produced as follows. First of all, in the above-described manner, the positive electrode 33 and the negative electrode 34 are produced, and the positive electrode lead 31 and the negative electrode lead 32 are attached to the positive electrode 33 and the negative electrode 34, respectively. After that, the positive electrode 33 and the negative electrode 34 are laminated with the separator 35 interposed therebetween, the laminate is wound, and the protective tape 37 is adhered to an outermost peripheral portion, thereby forming a wound body which is a precursor of the wound electrode body 30. Next, the wound body is interposed between the packaging members 40, the outer peripheral portions except for one side are adhered to each other by heat fusion to make a bag form, and the wound electrode body 30 is housed in the inside of the packaging member 40. Subsequently, an electrolyte composite including, a solvent, an electrolyte salt, a monomer which is a raw material of a polymer compound, a polymerization initiator, and another material such as a polymerization inhibitor as necessary is prepared and injected into the inside of the packaging member 40.

Next, the opening part of the packaging member 40 undergoes thermal fusion under a vacuum atmosphere to be sealed after the electrolyte composite is injected into the inside of the packaging member 40. Next, it is applied with heat such that the monomer is polymerized to be a polymer compound, formed into the gel-form electrolyte layer 36. As above, the secondary battery shown in FIG. 5 is obtained.

4. Fourth Embodiment (Configuration of Non-Aqueous Electrolyte Secondary Battery)

Figure 6:
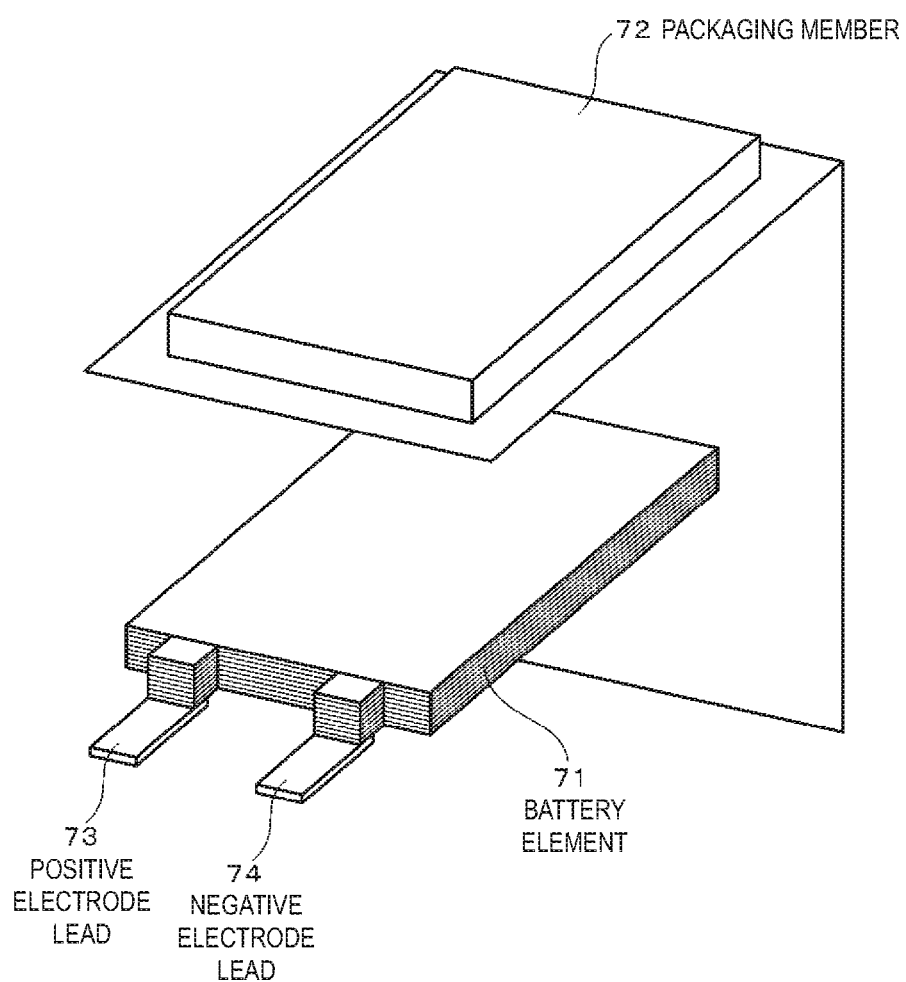
FIG. 6 is an exploded perspective view showing a configuration example of a non-aqueous electrolyte secondary battery according to a fourth embodiment of the present technology.

FIG. 6 is an exploded perspective view showing a configuration example of a non-aqueous electrolyte secondary battery according to a fourth embodiment of the present technology. As shown in FIG. 6, in the non-aqueous electrolyte secondary battery, a battery element 71 to which a positive electrode lead 73 and a negative electrode lead 74 are attached is accommodated inside a film-like packaging member 72, and enables a small, lightweight and thin battery to be implemented.

Each of the positive electrode lead 73 and the negative electrode lead 74 is led out from the inside of the packaging member 72 toward the outside in the same direction, for example.

Figure 7:
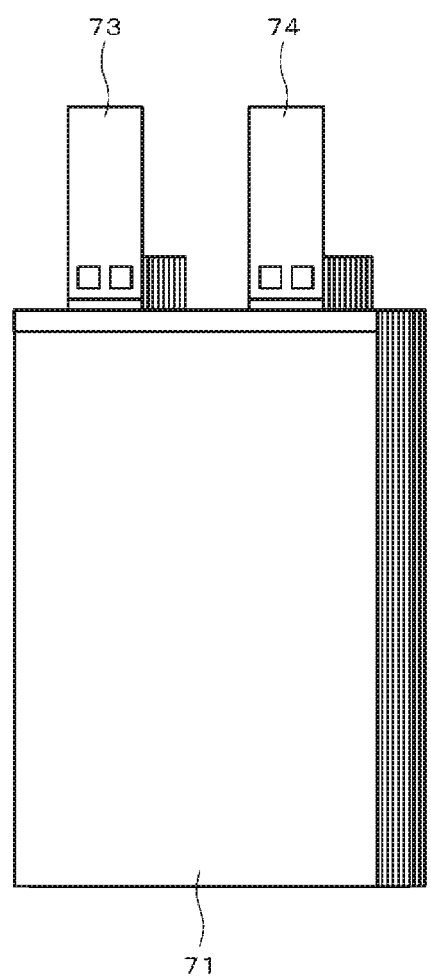
FIG. 7 is a perspective view showing an example of an exterior of a battery element shown in FIG. 6.
Figure 8:
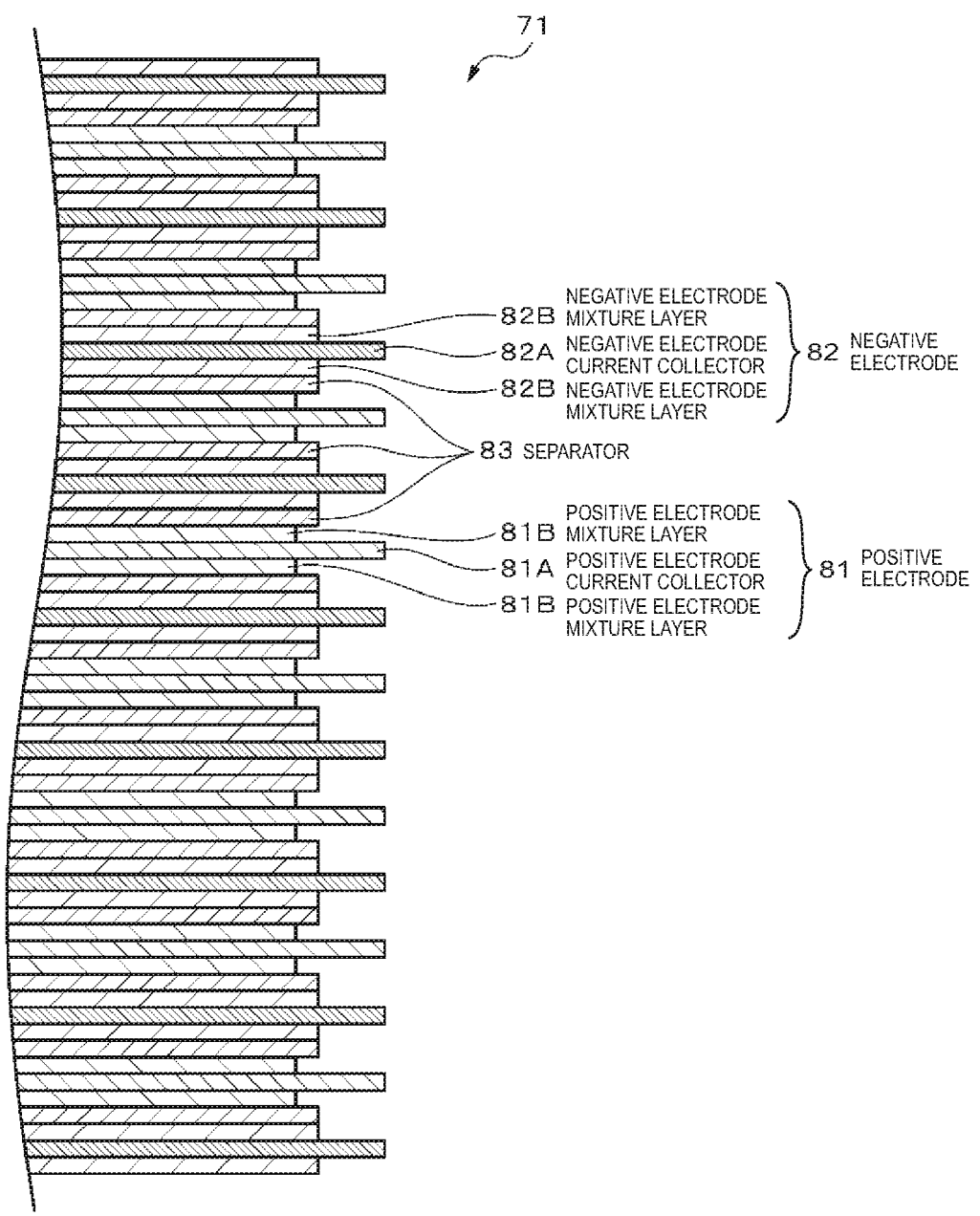
FIG. 8 is a cross-sectional view showing a configuration example of a battery element shown in FIG. 6.

FIG. 7 is a perspective view showing an example of an exterior of the battery element 71. FIG. 8 is a cross-sectional view showing a configuration example of the battery element 71. As shown in FIG. 7 and FIG. 8, the battery element 71 is a laminated electrode body in which a positive electrode 81 and a negative electrode 82 are laminated through a separator 83 and the electrolyte solution similar to that of the second embodiment is impregnated into the battery element 71.

Figure 9:
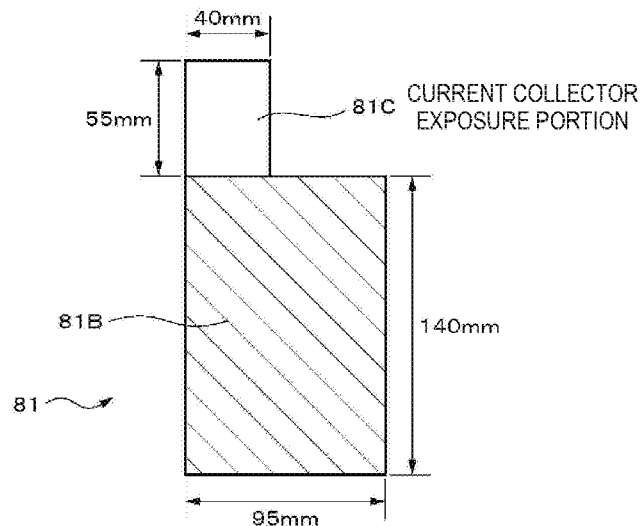
FIG. 9 is a plan view showing a configuration example of a positive electrode.

The positive electrode 81 has, for example, a structure in which a positive electrode active material layer 81B is provided on both sides of a positive electrode current collector 81A having a pair of sides. As shown in FIG. 9, the positive electrode 81 includes a rectangular electrode portion and a current collector exposure portion 81C that extends from one side of the electrode portion. In the current collector exposure portion 81C, the positive electrode active material layer 81B is not provided and the positive electrode current collector 81A is exposed. The current collector exposure portion 81C is electrically connected to the positive electrode lead 73. In addition, although not shown, a region in which the positive electrode active material layer 81B is included may be only on one side of the positive electrode current collector 81A.

Figure 10:
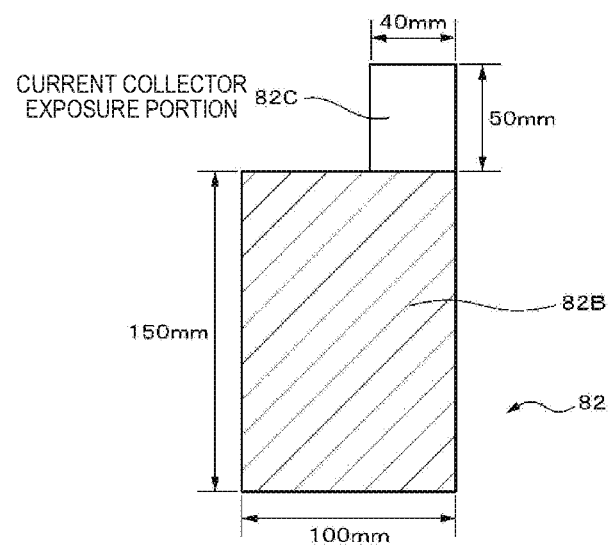
FIG. 10 is a plan view showing a configuration example of a negative electrode.

The negative electrode 82 has, for example, a structure in which a negative electrode active material layer 82B is provided on both sides of a negative electrode current collector 82A having a pair of sides. In addition, as shown in FIG. 10, the negative electrode 82 includes a rectangular electrode portion and a current collector exposure portion 82C that extends from one side of the electrode portion. In the current collector exposure portion 82C, the negative electrode active material layer 82B is not provided and the negative electrode current collector 82A is exposed. The current collector exposure portion 82C is electrically connected to the negative electrode lead 74. In addition, although not shown, a region in which the negative electrode active material layer 82B is included may be only on one side of the negative electrode current collector 82A.

Figure 11:
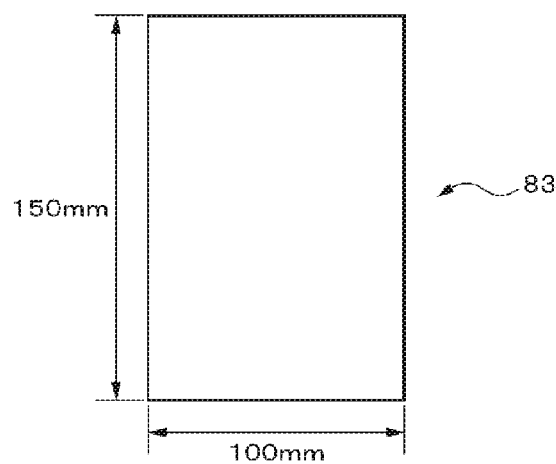
FIG. 11 is a plan view showing a configuration example of a separator.

The separator 83 has a shape such as a rectangle as shown in FIG. 11.

Materials of the positive electrode current collector 81A, the positive electrode active material layer 81B, the negative electrode current collector 82A, the negative electrode active material layer 82B, and the separator 83 are similar to those of the positive electrode current collector 21A, the positive electrode active material layer 21B, the negative electrode current collector 22A, the negative electrode active material layer 22B, and the separator 23 in the above-described second embodiment.

(Method of Manufacturing Non-Aqueous Electrolyte Secondary Battery)

The non-aqueous electrolyte secondary battery configured as described above can be manufactured, for example, as follows.

(Manufacturing Positive Electrode)

The positive electrode 81 is produced as follows. First, for example, a positive electrode active material, a binder, and a conductive assistant agent are mixed to prepare a positive electrode mixture. The positive electrode mixture is dispersed in an organic solvent such as N-methylpyrrolidone to prepare a paste-form positive electrode mixture slurry. Next, the slurry is applied on both sides of the positive electrode current collector 81A, dried, and then pressed to form the positive electrode active material layer 81B. Then, the result is cut into the shape shown in FIG. 9 and the positive electrode 81 is obtained.

(Manufacturing Negative Electrode)

The negative electrode 82 is produced as follows. First, for example, a negative electrode active material, a binder, and a conductive assistant agent are mixed to prepare a negative electrode mixture. The negative electrode mixture is dispersed in an organic solvent such as N-methylpyrrolidone to prepare a paste-form negative electrode mixture slurry. Next, the slurry is applied on both sides of the negative electrode current collector 82A, dried, and then pressed to form the negative electrode active material layer 82B. Then, the result is cut into the shape shown in FIG. 10 and the negative electrode 82 is obtained.

(Manufacturing Battery Element)

The battery element 71 is produced as follows. First, a microporous polypropylene film is cut into the shape shown in FIG. 11 and the separator 83 is prepared. Next, the plurality of negative electrodes 82, positive electrodes 81, and separators 83 obtained as described above are laminated in an order of, for example, the negative electrode 82, the separator 83, the positive electrode 81, . . . , the positive electrode 81, the separator 83, the negative electrode 82 as shown in FIG. 8 to manufacture the battery element 71.

Next, the current collector exposure portion 82C of the positive electrode 81 is welded to the positive electrode lead 73. Similarly, the current collector exposure portion 82C of the negative electrode 82 is welded to the negative electrode lead 74. Next, after the electrolyte solution is impregnated into the battery element 71, the battery element 71 is interposed between the packaging members 72, and outer periphery portions of the packaging member 72 are adhered to each other by thermal welding and enclosed. In this case, the positive electrode lead 73 and the negative electrode lead 74 extend to the outside of the packaging member 72 through the thermally fused portion, and set as positive and negative electrode terminals. In this manner, a target non-aqueous electrolyte secondary battery is obtained.

Modified Example

Next, a modified example of the fourth embodiment of the present technology will be described. A non-aqueous electrolyte secondary battery according to the modified example is different from that of the fourth embodiment in that a gel-like electrolyte layer is used in place of the electrolyte solution. In addition, the same portions as in the above-described fourth embodiment are denoted with the same reference signs, and descriptions thereof will be omitted.

(Structure of Non-Aqueous Electrolyte Secondary Battery)

Figure 12:
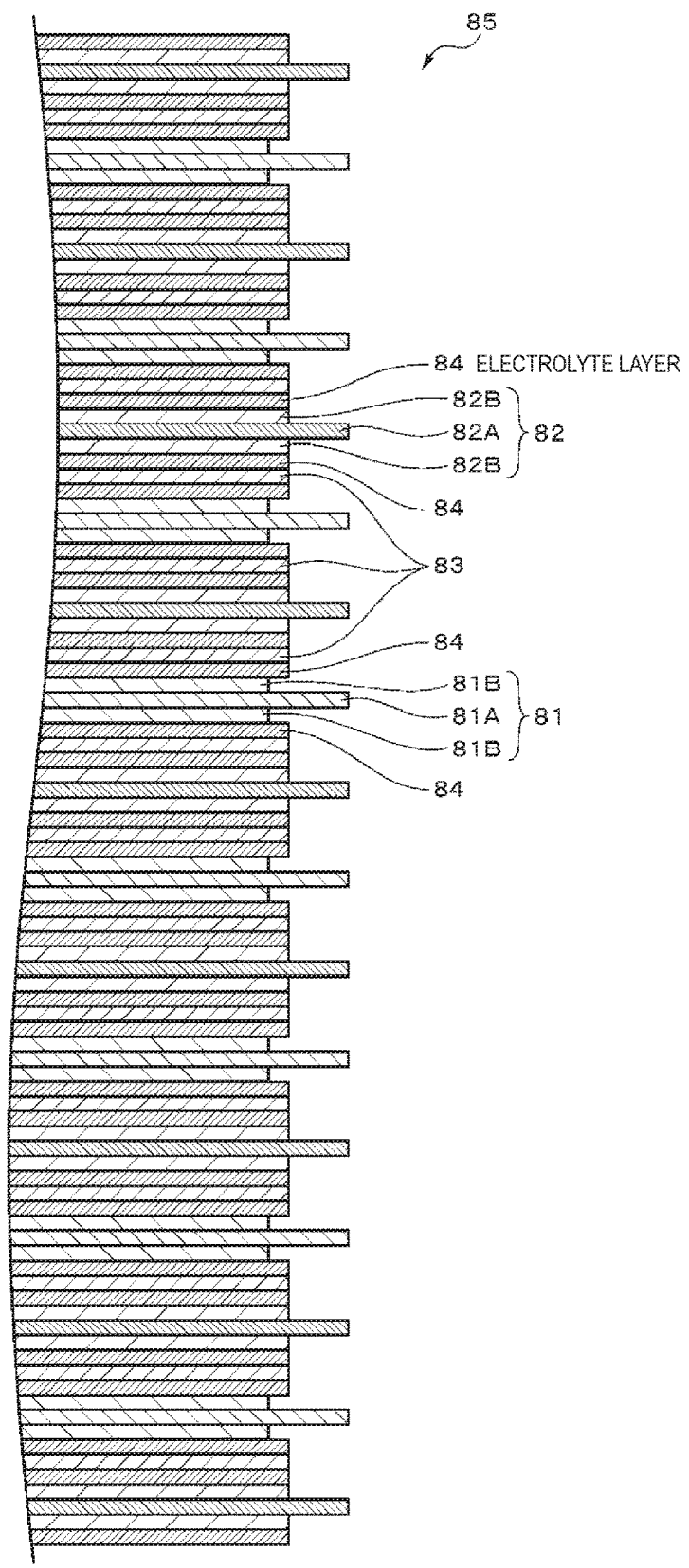
FIG. 12 is a cross-sectional view showing a configuration example of a battery element that is used in a non-aqueous electrolyte secondary battery according to a modified example of the fourth embodiment of the present technology.

FIG. 12 is a cross-sectional view showing a configuration example of a battery element that is used in a non-aqueous electrolyte secondary battery according to a modified example of the fourth embodiment of the present technology. A battery element 85 includes the positive electrode 81 and the negative electrode 82 that are laminated through the separator 83 and an electrolyte layer 84.

The electrolyte layer 84 includes the electrolyte solution according to the first embodiment and a polymer compound serving as a retention body that retains the electrolyte solution and is in a so-called gel-form. The gel-form electrolyte layer 84 is preferable because it can obtain high ionic conductivity and prevent leakage in the battery. A configuration of the polymer compound is similar to that of the non-aqueous electrolyte secondary battery according to the third embodiment.

(Method of Manufacturing Non-Aqueous Electrolyte Secondary Battery)

The non-aqueous electrolyte secondary battery configured as described above can be manufactured, for example, as follows.

First, a precursor solution including a solvent, an electrolyte salt, a polymer compound, and a mixed solvent is applied to each of the positive electrode 81 and the negative electrode 82, and the mixed solvent is then volatilized to form the electrolyte layer 84. Subsequent processes are similar to those of the above-described fourth embodiment except that the positive electrode 81 and the negative electrode 82 each having the electrolyte layer 84 formed thereon are used, and therefore a non-aqueous electrolyte secondary battery can be obtained.

5. Fifth Embodiment

In a fifth embodiment, a battery pack and an electronic device including the non-aqueous electrolyte secondary battery according to any of the second to fourth embodiments will be described.

Figure 13:
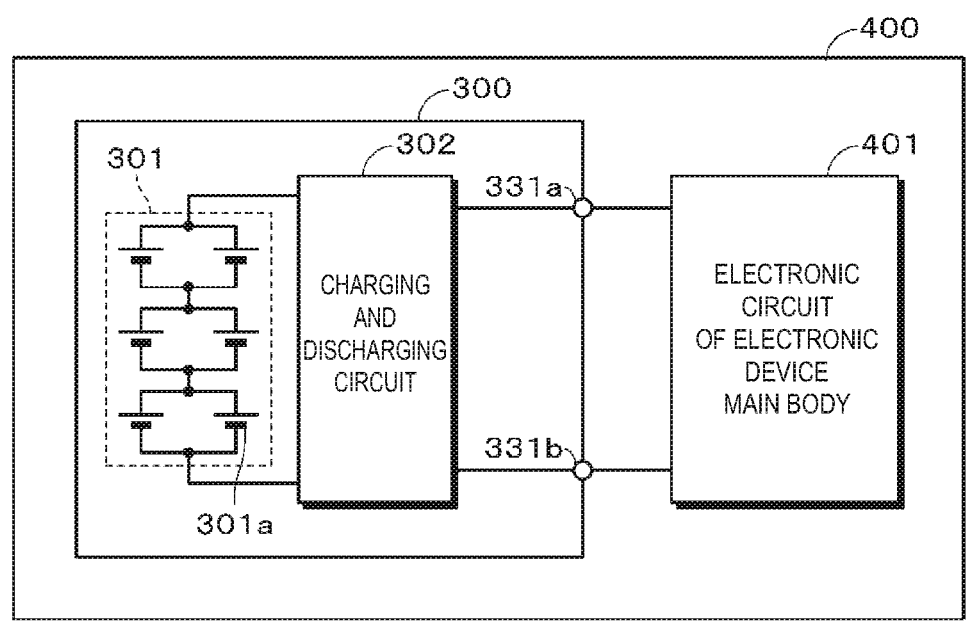
FIG. 13 is a block diagram showing a configuration example of a battery pack and an electronic device according to a fifth embodiment of the present technology.

A configuration example of a battery pack 300 and an electronic device 400 according to the fifth embodiment of the present technology will be described below with reference to FIG. 13. The electronic device 400 includes an electronic circuit 401 of an electronic device main body and the battery pack 300. The battery pack 300 is electrically connected to the electronic circuit 401 through a positive electrode terminal 331a and a negative electrode terminal 331b. The electronic device 400 has, for example, a configuration in which the battery pack 300 is detachable by a user. However, the configuration of the electronic device 400 is not limited thereto, and a configuration in which the battery pack 300 is built in the electronic device 400 so that the user is unable to remove the battery pack 300 from the electronic device 400 may be used.

When the battery pack 300 is charged, the positive electrode terminal 331a and the negative electrode terminal 331b of the battery pack 300 are connected to a positive electrode terminal and a negative electrode terminal of a charger (not shown), respectively. On the other hand, when the battery pack 300 is discharged (when the electronic device 400 is used), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook personal computer, a tablet computer, a mobile phone (for example, a smartphone), a personal digital assistant (PDA), an imaging device (for example, a digital still camera and a digital video camera), an audio device (for example, a portable audio player), a game device, a cordless phone extension unit, an E-book, an electronic dictionary, a radio, a headphone, a navigation system, a memory card, a pacemaker, a hearing aid, an electric tool, an electric shaver, a refrigerator, an air conditioner, a TV, a stereo, a water heater, a microwave, a dishwasher, a washing machine, a dryer, a lighting device, a toy, a medical device, a robot, a load conditioner, and a traffic light, and the present technology is not limited thereto.

(Electronic Circuit)

The electronic circuit 401 includes, for example, a CPU, a peripheral logic unit, an interface unit, and a storage unit, and controls the entire electronic device 400.

(Battery Pack)

The battery pack 300 includes an assembled battery 301 and a charging and discharging circuit 302. The assembled battery 301 includes a plurality of secondary batteries 301a that are connected in series and/or parallel. The plurality of secondary batteries 301a are connected, for example, in n parallel m series (n and m are positive integers). In addition, FIG. 13 shows an example in which six secondary batteries 301a are connected in 2 parallel 3 series (2P3S). As the secondary battery 301a, the non-aqueous electrolyte secondary battery according to any of the second to fourth embodiments is used.

When charging is performed, the charging and discharging circuit 302 controls charging of the assembled battery 301. On the other hand, when discharging is performed (that is, when the electronic device 400 is used), the charging and discharging circuit 302 controls discharging of the electronic device 400.

6. Sixth Embodiment

In a sixth embodiment, a power storage system in which the non-aqueous electrolyte secondary battery according to any of the second to fourth embodiments is included in a power storage device will be described. The power storage system may be any system that uses power and also includes a simple power device. The power system includes, for example, a smart grid, a home energy management system (HEMS), and a vehicle, and can store power.

[Configuration of Power Storage System]

Figure 14:
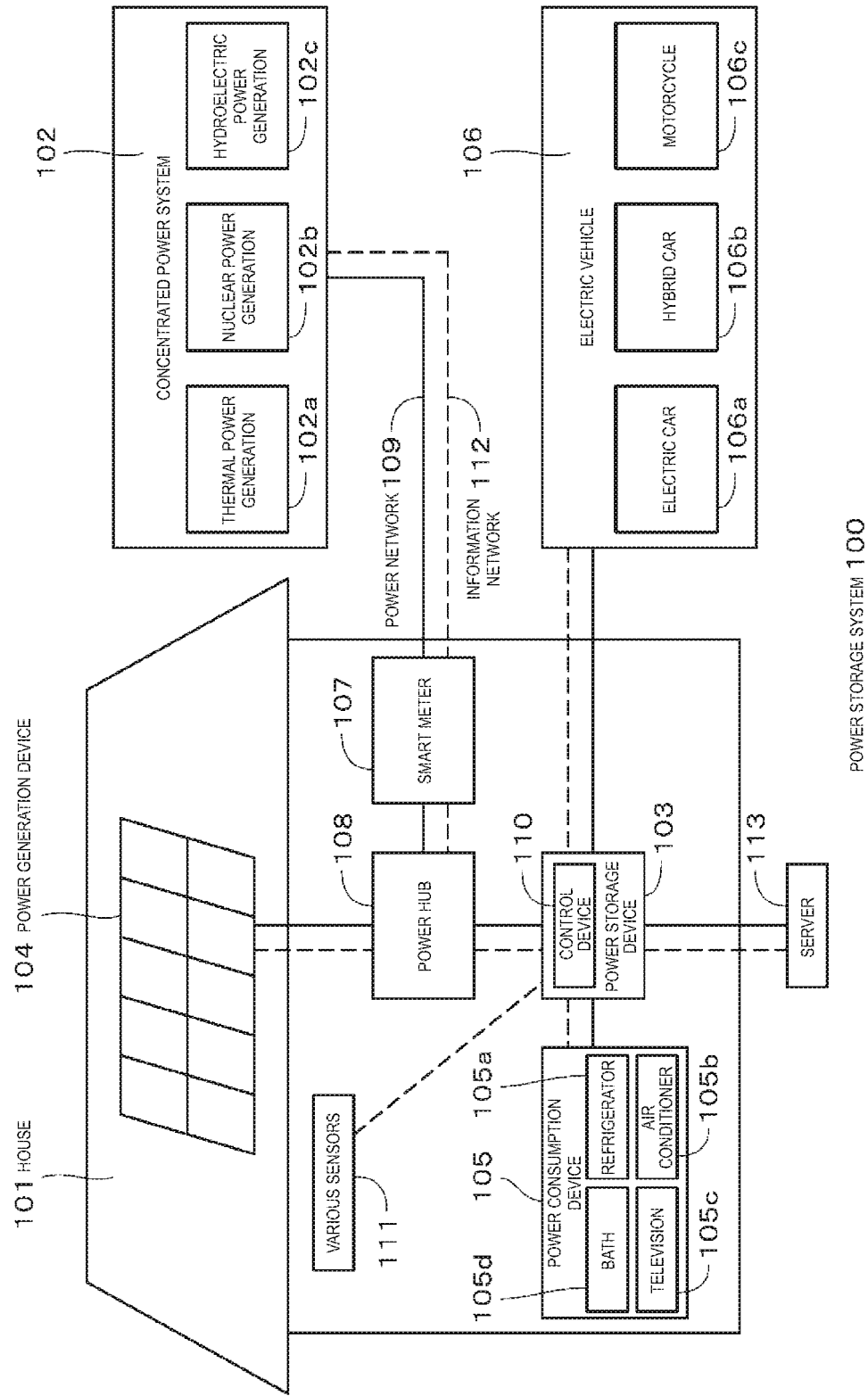
FIG. 14 is a schematic diagram showing a configuration example of a power storage system according to a sixth embodiment of the present technology.

A configuration example of a power storage system (power system) 100 according to the sixth embodiment will be described below with reference to FIG. 14. The power storage system 100 is for a house, and power is supplied to the power storage device 103 from a concentrated power system 102 including thermal power generation 102a, nuclear power generation 102b, hydroelectric power generation 102c, and the like, via a power network 109, an information network 112, a smart meter 107, a power hub 108, and the like. Further, power is supplied to the power storage device 103 from an independent power source such as a home power generation device 104. Power supplied to the power storage device 103 is stored, and power to be used in the house 101 is fed with use of the power storage device 103. The same power storage system can be used not only in the house 101 but also in a building.

The house 101 is provided with the home power generation device 104, a power consumption device 105, the power storage device 103, a control device 110 which controls each device, the smart meter 107, the power hub 108, and sensors 111 which acquires various pieces of information. The devices are connected to each other by the power network 109 and the information network 112. As the home power generation device 104, a solar cell, a fuel cell, or the like is used, and generated power is supplied to the power consumption device 105 and/or the power storage device 103. Examples of the power consumption device 105 include a refrigerator 105a, an air conditioner 105b, a television receiver 105c, a bath 105d, and the like. Examples of the power consumption device 105 further include an electric vehicle 106 such as an electric car 106a, a hybrid car 106b, or a motorcycle 106c.

The power storage device 103 includes the nonaqueous electrolyte secondary battery according any of the second embodiment to the fourth embodiment of the present technology. Functions of the smart meter 107 include measuring the used amount of commercial power and transmitting the measured used amount to a power company. The power network 109 may be any one or more of DC power supply, AC power supply, and contactless power supply.

Examples of the various sensors 111 include a motion sensor, an illumination sensor, an object detecting sensor, a power consumption sensor, a vibration sensor, a touch sensor, a temperature sensor, an infrared sensor, and the like. Information acquired by the various sensors 111 is transmitted to the control device 110. With the information from the sensors 111, weather conditions, people conditions, and the like are caught, and the power consumption device 105 is automatically controlled so as to make the energy consumption minimum. Further, the control device 110 can transmit information about the house 101 to an external power company via the Internet, for example.

The power hub 108 performs processes such as branching off power lines and DC/AC conversion. Examples of communication schemes of the information network 112 connected to the control device 110 include a method using a communication interface such as UART (Universal Asynchronous Receiver/Transceiver), and a method using a sensor network according to a wireless communication standard such as Bluetooth (registered trademark), ZigBee, or Wi-Fi. A Bluetooth (registered trademark) scheme can be used for multimedia communication, and one-to-many connection communication can be performed. ZigBee uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 110 is connected to an external server 113. The server 113 may be managed by any of the house 101, an electric company, and a service provider. Examples of information transmitted and received by the server 113 include power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the PDA (Personal Digital Assistant).

The control device 110 controlling each part is configured with a CPU (Central Processing Unit), a RAM (Random Access Memory), a ROM (Read Only Memory), and the like, and is stored in the power storage device 103 in this example. The control device 110 is connected to the power storage device 103, the home power generation device 104, the power consumption device 105, the various sensors 111, and the server 113 via the information network 112, and has a function of adjusting the used amount of commercial power and the power generation amount, for example. Note that the control device 110 may further have a function of performing power trade in the power market.

As described above, power generated by not only the concentrated power system 102 such as the thermal power generation 102a, the nuclear power generation 102b, and the hydroelectric power generation 102c, but also the home power generation device 104 (solar power generation or wind power generation) can be stored in the power storage device 103. Therefore, even when the power generated by the home power generation device 104 varies, the amount of power supplied to the outside can be constant, or only necessary discharge can be controlled. For example, power generated by the solar power generation can be stored in the power storage device 103 and also inexpensive power at midnight can be stored in the power storage device 103 during nighttime, so that power stored in the power storage device 103 can be discharged and used when the power fee is expensive during daytime.

Note that although this example shows the control device 110 housed in the inside of the power storage device 103, the control device 110 may be housed in the inside of the smart meter 107 or configured independently. Further, the power storage system 100 may be used for a plurality of houses in a multiple dwelling house or a plurality of separate houses.

7. Seventh Embodiment

In a seventh embodiment, an electric vehicle including the non-aqueous electrolyte secondary battery according to any of the second to fourth embodiments will be described.

Figure 15:
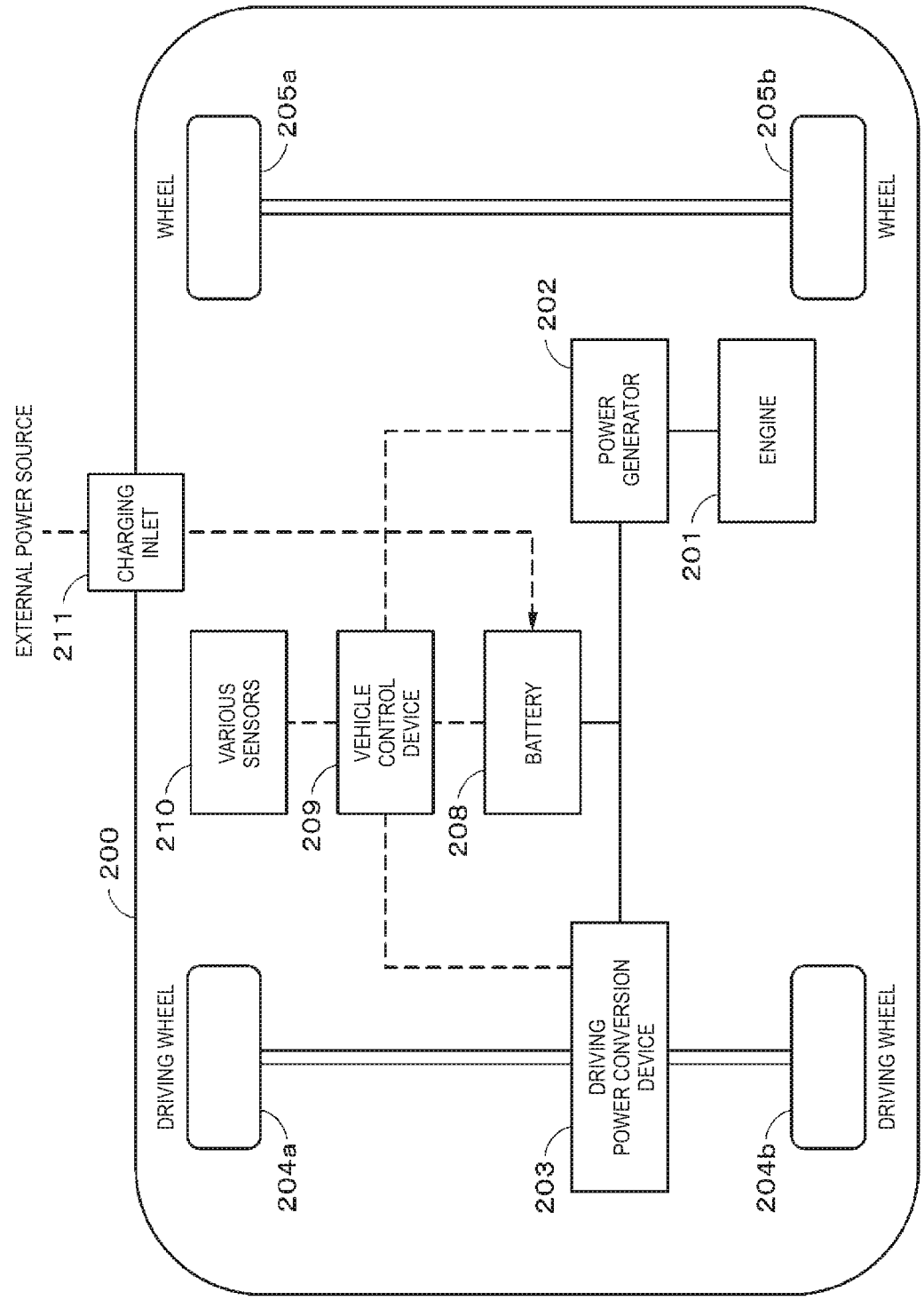
FIG. 15 is a schematic diagram showing a configuration of an electric vehicle according to a seventh embodiment of the present technology.

A configuration of an electric vehicle according to the seventh embodiment of the present technology will be described with reference to FIG. 15. The hybrid vehicle 200 is a hybrid vehicle that uses a series hybrid system. The series hybrid system is a vehicle that uses power generated by a power generator that is moved by an engine or power that is generated by a power generator and stored temporarily in a battery and is operated by a driving power conversion device 203.

A hybrid vehicle 200 incorporates an engine 201, a power generator 202, the driving power conversion device 203, driving wheels 204a and 204b, wheels 205a and 205b, a battery 208, a vehicle control device 209, various sensors 210, and a charging inlet 211. For the battery 208, the nonaqueous electrolyte secondary battery according any of the second embodiment to the fourth embodiment of the above-described present technology is used.

The hybrid vehicle 200 runs by using the driving power conversion device 203 as a power source. One of examples of the driving power conversion device 203 is a motor. Power in the battery 208 drives the driving power conversion device 203, and the rotating power of the driving power conversion device 203 is transmitted to the driving wheels 204a and 204b. Note that by using DC/AC conversion or AC/DC conversion in a necessary portion, an alternate current motor or a direct current motor can be used for the driving power conversion device 203. The various sensors 210 control the number of engine rotation via the vehicle control device 209 and controls the aperture of an unshown throttle valve (throttle aperture). The various sensors 210 include a speed sensor, an acceleration sensor, a sensor of the number of engine rotation, and the like.

The rotating power of the engine 201 is transmitted to the power generator 202, and power generated by the power generator 202 with the rotating power can be stored in the battery 208.

When the hybrid vehicle 200 reduces the speed with an unshown brake mechanism, the resisting power at the time of the speed reduction is added to the driving power conversion device 203 as the rotating power, and regenerative power generated by the driving power conversion device 203 with this rotating power is stored in the battery 208.

The battery 208 is connected to a power source outside the hybrid vehicle 200 through the charging inlet 211, receives power supply from the external power source using the charging inlet 211 as an input port, and can accumulate the received power.

Although not shown, an information processing device which performs information processing about vehicle control based on information about the non-aqueous electrolyte secondary battery may be provided. Examples of such an information processing device include an information processing device which displays the remaining battery based on information about the remaining non-aqueous electrolyte secondary battery.

Note that the above description is made by taking an example of the series hybrid car which runs with a motor using power generated by a power generator driven by an engine or power obtained by storing the power in a battery. However, an embodiment of the present disclosure can also be applied effectively to a parallel hybrid car which uses the output of an engine and a motor as the driving power source and switches three modes as appropriate: driving with the engine only; driving with the motor only; and driving with the engine and the motor. Further, an embodiment of the present disclosure can also be applied effectively to a so-called electric vehicle which runs by being driven with a driving motor only, without an engine.

EXAMPLES

The present technology will be described below in detail with reference to examples and the present technology is not limited to the following examples.

Example 1

First, as core particle powder, powder of lithium cobalt oxide particles (average chemical composition analysis value: $Li_{0.97}CoO_2$) having an average particle size of 20 μm and a specific surface area of 0.3 $m^2/g$, which were measured by a laser scattering method, was prepared. Next, 100 parts by weight of the lithium cobalt oxide particle powder was stirred and dispersed in 3000 parts by weight of a 2N lithium hydroxide (LiOH) aqueous solution at 80° C. for 1 hour. Next, a solution in which 1 part by weight of manganese nitrate $(Mn(NO_3)_2.6H_2O)$ and 3 parts by weight of nickel nitrate $(Ni(NO_3)_2.6H_2O)$, which are commercially available reagents, were dissolved in 100 parts by weight of pure water was added to the dispersed solution over 2 hours. The solution was adjusted to PH 12 or higher using a NaOH aqueous solution and hydroxide was precipitated. Further, the solution was continuously stirred and dispersed at 80° C. for 1 hour and cooled. Next, the dispersed system was filtered and dried at 120° C., and a precursor was obtained. 100 parts by weight of the precursor sample was impregnated into 150 parts by weight of a 2N lithium carbonate $(Li_2CO_3)$ aqueous solution in order to adjust an amount of lithium, and uniformly mixed and dried, and a calcination precursor was obtained. Next, the calcination precursor was heated at a rate of 5° C./minute by an electric furnace, left at 950° C. for 5 hours, and was then cooled to 150° C. at a rate of 7° C./minute. Accordingly, a covering layer including an oxide of Li, Ni and Mn was formed on a surface of the core particle. In this manner, a target positive electrode active material was obtained.

Example 2

A positive electrode active material was obtained in the same manner as in Example 1 except that a calcination precursor was heated at a rate of 5° C./minute by an electric furnace, and left at 950° C. for 3 hours

Example 3

A positive electrode active material was obtained in the same manner as in Example 1 except that a calcination precursor was heated at a rate of 5° C./minute by an electric furnace, and left at 950° C. for 7 hours.

Example 4

A positive electrode active material was obtained in the same manner as in Example 1 except that a calcination precursor was heated at a rate of 7° C./minute by an electric furnace, and left at 950° C. for 5 hours.

Example 5

A positive electrode active material was obtained in the same manner as in Example 1 except that a calcination precursor was heated at a rate of 2° C./minute by an electric furnace, and left at 950° C. for 5 hours.

Example 6

A positive electrode active material was obtained in the same manner as in Example 1 except that a solution in which 1.5 parts by weight of manganese nitrate ($Mn(NO_3)_2.6H_2O$) and 2.5 parts by weight of nickel nitrate ($Ni(NO_3)_2.6H_2O$), which are commercially available reagents, were dissolved in 100 parts by weight of pure water was used as a solution to be added to a dispersed solution.

Example 7

A positive electrode active material was obtained in the same manner as in Example 1 except that a solution in which 1 part by weight of manganese nitrate ($Mn(NO_3)_2.6H_2O$) and 6 parts by weight of nickel nitrate ($Ni(NO_3)_2.6H_2O$), which are commercially available reagents, were dissolved in 100 parts by weight of pure water was used as a solution to be added to a dispersed solution.

Comparative Example 1

A positive electrode active material was obtained in the same manner as in Example 1 except that a calcination precursor was heated at a rate of 5° C./minute by an electric furnace, and left at 850° C. for 5 hours.

Comparative Example 2

A positive electrode active material was obtained in the same manner as in Example 1 except that a solution in which 4 parts by weight of manganese nitrate ($Mn(NO_3)_2.6H_2O$) and 4 parts by weight of nickel nitrate ($Ni(NO_3)_2.6H_2O$), which are commercially available reagents, were dissolved in 100 parts by weight of pure water was used as a solution to be added to a dispersed solution.

Comparative Example 3

A positive electrode active material was obtained in the same manner as in Example 1 except that a calcination precursor was heated at a rate of 5° C./minute by an electric furnace, and left at 950° C. for 1 hour.

Comparative Example 4

A positive electrode active material was obtained in the same manner as in Example 1 except that a calcination precursor was heated at a rate of 5° C./minute by an electric furnace, and left at 750° C. for 5 hours.

Comparative Example 5

A positive electrode active material was obtained in the same manner as in Example 1 except that a solution in which 3 parts by weight of manganese nitrate ($Mn(NO_3)_2.6H_2O$) and 1 part by weight of nickel nitrate ($Ni(NO_3)_2.6H_2O$), which are commercially available reagents, were dissolved in 100 parts by weight of pure water was used as a solution to be added to a dispersed solution.

Comparative Example 6

A positive electrode active material was obtained in the same manner as in Example 1 except that a solution in which 0.5 parts by weight of manganese nitrate ($Mn(NO_3)_2.6H_2O$) and 3 parts by weight of nickel nitrate ($Ni(NO_3)_2.6H_2O$), which are commercially available reagents, were dissolved in 100 parts by weight of pure water was used as a solution to be added to a dispersed solution.

Comparative Example 7

A positive electrode active material was obtained in the same manner as in Example 1 except that a solution in which 4 parts by weight of manganese nitrate ($Mn(NO_3)_2.6H_2O$), which is a commercially available reagent, was dissolved in 100 parts by weight of pure water was used as a solution to be added to a dispersed solution.

Comparative Example 8

A positive electrode active material was obtained in the same manner as in Example 1 except that a solution in which 4 parts by weight of nickel nitrate ($Ni(NO_3)_2.6H_2O$), which is a commercially available reagent, was dissolved in 100 parts by weight of pure water was used as a solution to be added to a dispersed solution.

Comparative Example 9

The same lithium cobalt oxide particle powder as in Example 1 was prepared. The particle powder having no covering layer formed on its surface was used as a positive electrode active material.

Comparative Example 10

A solution in which 3 parts by weight of manganese nitrate ($Mn(NO_3)_2.6H_2O$), 3 parts by weight of nickel nitrate ($Ni(NO_3)_2.6H_2O$), and 3 parts by weight of cobalt nitrate ($Co(NO_3)_2.6H_2O$), which are commercially available reagents, were dissolved in 100 parts by weight of pure water was added to 3000 parts by weight of a 2N lithium hydroxide (LiOH) aqueous solution over 2 hours, the solution was then adjusted to PH 12 or higher using a NaOH aqueous solution, and hydroxide was precipitated. Then, the solution was continuously stirred and dispersed at 80° C. for 1 hour, and cooled. The dispersed system was filtered and dried at 120° C., and Li—Ni—Mn—Co oxide disclosed in Patent Literature 2 was prepared. Lithium carbonate as a lithium source was adjusted to a molar ratio of Li:(Ni+Co+Mn)=100:100 with respect to the Li—Ni—Mn—Co oxide, a precursor was obtained, and the precursor and the same lithium cobalt oxide particle powder as in Example 1 were then mixed at a weight ratio of 15:85. The mixture was treated by a mechanochemical device for 1 hour, heated at a rate of 5° C./minute and left at 950° C. for 5 hours, and was cooled to 150° C. at a rate of 7° C./minute. In this manner, a target positive electrode active material was obtained.

Comparative Example 11

Li—Ni—Co—Mn oxide particle powder having no covering layer and having NiMn in a solid solution state was prepared as follows. First, lithium carbonate ($Li_2CO_3$), cobalt carbonate ($CoCO_3$), nickel hydroxide ($Ni(OH)_2$), and manganese hydroxide ($Mn(OH)_2$) were mixed at a molar ratio of 0.5:0.98:0.05:0.05. Next, the mixture was treated by a mechanochemical device for 1 hour, and then calcined at 900° C. for 5 hours in air. In this manner, a target positive electrode active material was obtained.

(Evaluation)

The positive electrode active materials of Examples 1 to 7 and Comparative Examples 1 to 11 obtained as described above were evaluated as follows.

(Mole Fractions $r_n$ and $r_m$, and Ratios $r_{n2}/r_{n1}$ and $r_{m2}/r_{m1}$)

A ratio d and a mole fraction r of the positive electrode active materials were determined as follows. 0.01 mol/l of hydrochloric acid (commercially available from Kanto Kagaku) (10 ml) was added to 0.2 g of the positive electrode active material, stirred after 1, 2, ..., 20 minutes, i.e. every minute, and filtered through a filter of 0.2 Mass/volume concentrations of cobalt (Co) that was a main transition metal element, and the metal elements manganese (Mn) and nickel (Ni) in each of the obtained solutions were measured using an SPS3100 sequential type ICP emission spectrometer (commercially available from Hitachi High-Tech Science Corporation), and masses of Co, Ni and Mn dissolved in 0.01 mol/l of hydrochloric acid were calculated. Further, amounts [mols] of substances of the metal elements Co, Ni and Mn were calculated using the masses. Based on expressions (1) to (3), a ratio d, a mole fraction $r_n$ of Ni, and a mole fraction $r_m$ of Mn from a surface of a surface-covered composite particle to a predetermined depth were determined. Here, a particle was assumed to have a spherical form and the particle was assumed to be changed to a state in which its radius was reduced according to dissolution while the particle maintained a form similar to a spherical form for calculation. In addition, a mass of the positive electrode active material before hydrochloric acid was added was set as a total mass of composite particles.

Based on the ratio d, the mole fraction $r_n$ of Ni, and the mole fraction $r_m$ of Mn calculated as described above, mole fractions of $r_{n1}$ and $r_{n2}$ of Ni in a depth in which a ratio d (%) satisfied d=0.04% or d=0.20%, were extracted. In addition, in a depth in which a ratio d (%) satisfied d=0.04% or d=0.20%, mole fractions $r_{m1}$ and $r_{m2}$ of Mn were extracted. These mole fractions were used to calculate a ratio $r_{n2}/r_{n1}$ and a ratio $r_{m2}/r_{m1}$.

In addition, a covering state of Mn and Ni in a range in which a ratio d was 0.04[%]≤d≤0.2[%] can be considered to be particularly effective in improving a cycle characteristic and a high-temperature preservation characteristic. Thus, in this example, positive electrode active materials in which values of mole fractions $r_n$ and $r_m$ of Ni and Mn were changed in a range of 0.04[%]≤d≤0.2[%] that can be considered to be particularly effective in improving a cycle characteristic and a high-temperature preservation characteristic were prepared and evaluation results thereof were compared.

(Initial Discharge Capacity and Capacity Retention Rate)

A non-aqueous electrolyte secondary battery was produced using the positive electrode active material as follows.

A positive electrode was produced as follows. First, the positive electrode active material of 98 weight %, amorphous carbon powder (Ketjen black) of 0.8 weight %, and polyvinylidene fluoride (PVdF) of 1.2 weight % were mixed to prepare a positive electrode mixture. Next, the positive electrode mixture was dispersed in N-methyl-2-pyrrolidone (NMP), and a positive electrode mixture slurry was prepared. Then, the positive electrode mixture slurry was uniformly applied to a positive electrode current collector made of strip aluminum foil. The obtained application product was dried by hot air and then compressed and molded by a punching hydraulic press machine at ϕ15 mm. Thus, the positive electrode was obtained.

A negative electrode was produced as follows. First, graphite powder of 95 weight % and PVdF of 5 weight % were mixed to prepare a negative electrode mixture. Next, the negative electrode mixture was dispersed in N-methyl-2-pyrrolidone to prepare a negative electrode mixture slurry. Then, the negative electrode mixture slurry was uniformly applied to a negative electrode current collector made of strip copper foil and dried by hot air. Then, compression molding was performed by a punching hydraulic press machine at ϕ16 mm. Thus, the negative electrode was obtained.

The positive electrode and the negative electrode produced as described above were laminated through a porous polyolefin film and an electrode body was produced.

Ethylene carbonate and propylene carbonate were mixed at a volume mixing ratio of 1:1 and a mixed solution was adjusted. Next, $LiPF_6$ was dissolved to a concentration of 1 mol/$dm^3$ in the mixed solution and a non-aqueous electrolyte solution was prepared.

The electrode body and the electrolyte solution were used to manufacture a CR2032 coin type non-aqueous electrolyte secondary battery.

A capacity retention rate of the non-aqueous electrolyte secondary battery produced as described above was determined as follows. First, charging was performed under conditions of an ambient temperature of 23° C., a charging voltage of 4.35 V, a charging current of 0.5 mA, and a charging time of 10 hours, discharging was then performed under conditions of a discharging current of 2.5 mA, and a termination voltage of 3.0 V, and an initial discharge capacity (a discharge capacity of the 1st cycle) was measured. Next, charging and discharging were repeated under the above charging conditions of an ambient temperature of 23° C., a charging voltage of 4.35 V, a charging current of 0.5 mA, and a charging time of 10 hours and under the above discharging conditions of a discharging current of 2.5 mA, and a termination voltage of 3.0 V. Then, a discharge capacity of the 50th cycle was measured. Next, the discharge capacity of the 1st cycle and the discharge capacity of the 50th cycle were used to determine a capacity retention rate after 50 cycles based on the following expression.

capacity retention rate [%] after 50 cycles=(discharge capacity of the 50*th* cycle/discharge capacity of the 1*st* cycle)×100

(High-Temperature Preservation Characteristic)

A non-aqueous electrolyte secondary battery was produced similarly to that of evaluation of the "initial discharge capacity and capacity retention rate," except that two porous polyolefin films were disposed between the positive electrode and the negative electrode, and a high-temperature preservation characteristic of the secondary battery was evaluated as follows. First, charging was performed under conditions of an ambient temperature of 23° C., a charging voltage of 4.35 V, a charging current of 0.5 mA, and a charging time of 10 hours, and discharging was then performed under conditions of a discharging current of 0.5 mA, and a termination voltage of 3.0 V. Next, charging was performed under conditions of an ambient temperature of 23° C., a charging voltage of 4.35 V, a charging current of 0.5 mA, and a charging time of 10 hours. Then, the secondary battery was stored in an environment of a high temperature of 60° C. for 168 hours. The stored cell was disassembled, and the negative electrode and the separator were boiled in 15 ml of hydrochloric acid (1 M) for 15 minutes. The solution was filtered, and a concentration of Co included in the solution was measured using the SPS3100 sequential type ICP emission spectrometer (commercially available from Hitachi High-Tech Science Corporation). An elution amount of Co during storage was measured based on the following expression.

Co elution amount=(Co concentration)/(active material weight included in positive electrode)

Note that the measurement result indicates a relative value when an elution amount of Co of Example 1 is set to 100.

(Filling Ability Evaluation)

The positive electrode active material obtained as described above and carboxyl methyl cellulose were mixed at a ratio of 97:3 in a mortar for 10 minutes. Then, 1 g thereof was weighed, input into a metal mold of ϕ15 mm, and pressed by a hydraulic press machine for 20 seconds, and pellets of powder were prepared. A weight for each volume of the pellets was calculated and thus a filling ability was evaluated.

(SEM Observation)

Figure 16A:
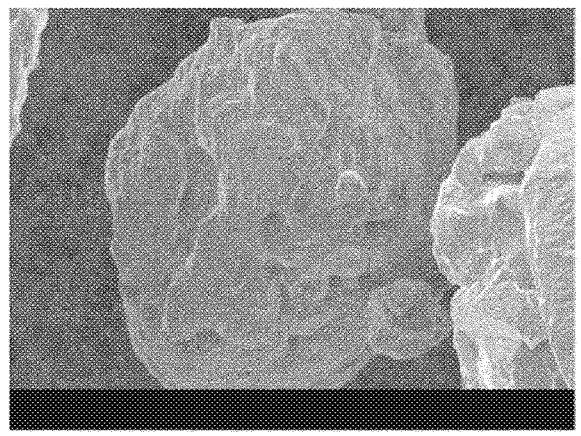
FIG. 16A shows an SEM image of a positive electrode active material of Example 1.
Figure 16B:
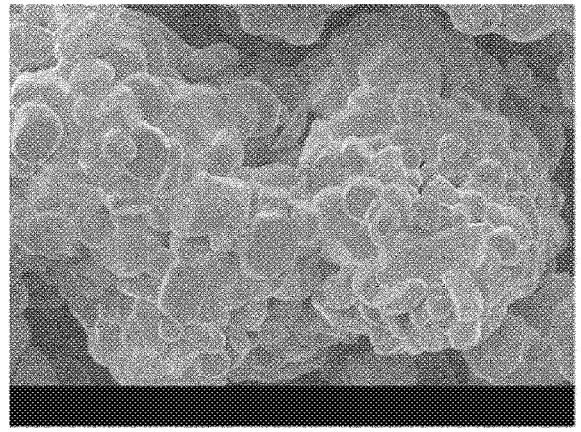
FIG. 16B shows an SEM image of a positive electrode active material of Comparative Example 11.

The positive electrode active materials of Example 1 and Comparative Example 11 were observed under a scanning electron microscope (SEM). The results are shown in FIG. 16A (Example 1) and FIG. 16B (Comparative Example 11). The positive electrode active material of Comparative Example 11 had particles whose shapes were largely changed compared to the positive electrode active material of Example 1. In addition, the positive electrode active material of Comparative Example 11 was formed by an aggregate of primary particles smaller than those of the positive electrode active material of Example 1. Therefore, a significantly decreased filling ability was observed in the positive electrode active material of Comparative Example 1.

Table 1 shows evaluation results of the positive electrode active materials of Examples 1 to 7, and Comparative Examples 1 to 11.

TABLE 1

| | Ni | | | | Mn | | | | Initial discharge capacity [mA] | Cycle retention rate [%] | Metal (Co) elution amount | Filling ability [g/cc] |
|---|---|---|---|---|---|---|---|---|---|---|---|---|
| | $r_{n1}$ (d = 0.04[%]) | $r_{n2}$ (d = 0.2[%]) | $r_{n2}/r_{n1}$ | Increase or decrease of $r_n$ | $r_{m1}$ (d = 0.04[%]) | $r_{m2}$ (d = 0.2[%]) | $r_{m2}/r_{m1}$ | Increase or decrease of $r_m$ | | | | |
| Example 1 | 0.085 | 0.082 | 0.96 | Decrease | 0.093 | 0.080 | 0.86 | Decrease | 5.0 | 92 | 100 | 3.81 |
| Example 2 | 0.081 | 0.069 | 0.85 | Decrease | 0.081 | 0.070 | 0.86 | Decrease | 5.1 | 92 | 110 | 3.80 |
| Example 3 | 0.070 | 0.069 | 0.99 | Decrease | 0.091 | 0.066 | 0.95 | Decrease | 4.9 | 92 | 103 | 3.81 |
| Example 4 | 0.091 | 0.077 | 0.85 | Decrease | 0.080 | 0.068 | 0.85 | Decrease | 5.0 | 91 | 105 | 3.82 |
| Example 5 | 0.080 | 0.074 | 0.93 | Decrease | 0.078 | 0.077 | 0.99 | Decrease | 4.9 | 92 | 108 | 3.80 |
| Example 6 | 0.052 | 0.050 | 0.96 | Decrease | 0.080 | 0.074 | 0.93 | Decrease | 5.0 | 91 | 110 | 3.81 |
| Example 7 | 0.085 | 0.074 | 0.87 | Decrease | 0.052 | 0.050 | 0.96 | Decrease | 5.0 | 90 | 104 | 3.82 |
| Comparative Example 1 | 0.091 | 0.068 | 0.75 | Decrease | 0.076 | 0.066 | 0.87 | Decrease | 4.9 | 90 | 152 | 3.80 |
| Comparative Example 2 | 0.080 | 0.082 | 1.03 | Increase | 0.076 | 0.074 | 0.97 | Decrease | 5.1 | 91 | 183 | 3.80 |
| Comparative Example 3 | 0.080 | 0.069 | 0.85 | Decrease | 0.080 | 0.065 | 0.81 | Decrease | 5.0 | 90 | 210 | 3.82 |
| Comparative Example 4 | 0.091 | 0.068 | 0.75 | Decrease | 0.094 | 0.070 | 0.75 | Decrease | 5.1 | 91 | 152 | 3.77 |
| Comparative Example 5 | 0.053 | 0.045 | 0.85 | Decrease | 0.076 | 0.074 | 0.93 | Decrease | 4.9 | 90 | 163 | 3.81 |
| Comparative Example 6 | 0.080 | 0.074 | 0.93 | Decrease | 0.051 | 0.041 | 0.80 | Decrease | 5.1 | 91 | 151 | 3.80 |
| Comparative Example 7 | 0.080 | 0.074 | 0.93 | Decrease | — | — | — | — | 4.9 | 91 | 356 | 3.82 |
| Comparative Example 8 | — | — | — | — | 0.080 | 0.074 | 0.93 | Decrease | 4.8 | 91 | 398 | 3.81 |
| Comparative Example 9 | — | — | — | — | — | — | — | — | 5.0 | 89 | 546 | 3.81 |
| Comparative Example 10 | 0.072 | 0.061 | 0.85 | Decrease | 0.098 | 0.058 | 0.59 | Decrease | 5.1 | 91 | 321 | 3.78 |
| Comparative Example 11 | 0.056 | 0.061 | 0.92 | Decrease | 0.074 | 0.067 | 0.91 | Decrease | 4.7 | 89 | 421 | 3.62 |

Metal (Co) elution amount: relative value when Example 1 is set to 100

The following can be understood from the above evaluation results.

In Examples 1 to 7, the mole fraction $r_n$ of Ni and the mole fraction $r_m$ of Mn decreased from a surface of the composite particle toward the center. In addition, in a depth range in which a ratio d (%) satisfied 0.04%≤d≤0.20%, the mole fraction $r_n$ and the mole fraction $r_m$ were within ranges of 0.05≤$r_n$ and 0.05≤$r_m$, respectively. In addition, the ratio $r_{n2}/r_{n1}$ and the ratio $r_{m2}/r_{m1}$ were within ranges of 0.85≤$r_{n2}/r_{n1}$≤1.0 and 0.85≤$r_{m2}/r_{m1}$≤1.0, respectively. Accordingly, an excellent cycle characteristic and a high-temperature preservation characteristic were obtained without a decrease of the discharge capacity.

In Comparative Example 1, since a ratio $r_{n2}/r_{n1}$ of Ni was $r_{n2}/r_{n1}$<0.85, a high-temperature preservation characteristic deteriorated. In Comparative Example 2, since a ratio $r_{n2}/r_{n1}$ of Ni was 1.0<$r_{n2}/r_{n1}$, a high-temperature preservation characteristic deteriorated. In Comparative Example 3, a ratio $r_{m2}/r_{m1}$ of Mn was $r_{m2}/r_{m1}$<0.85, and a high-temperature preservation characteristic deteriorated. In Comparative Example 4, since a ratio $r_{n2}/r_{n1}$ of Ni was $r_{n2}/r_{n1}$<0.85 and a ratio $r_{m2}/r_{m1}$ of Mn was $r_{m2}/r_{m1}$<0.85, a high-temperature preservation characteristic deteriorated. In addition, it was difficult to prepare covering particles having a ratio $r_{m2}/r_{m1}$ of Mn of 1.0<$r_{m2}/r_{m1}$ by a covering method. This is because, due to the large ionic radius of Mn, it was difficult to cause a state in which a concentration of Mn was high inside particles when the covering method was used for preparation. Even if such covering particles were prepared, a high-temperature preservation characteristic is considered to deteriorate in a battery produced using such covering particles.

In Comparative Example 5, since there was a region in which the mole fraction $r_n$ of Ni was outside a range of 0.05≤$r_n$ in a depth range in which a ratio d (%) satisfied 0.04%≤d≤0.20%, a high-temperature preservation characteristic deteriorated. In Comparative Example 6, since there was a region in which the mole fraction $r_m$ of Mn was outside a range of 0.05≤$r_m$ in a depth range in which a ratio d (%) satisfied 0.04%≤d≤0.20%, a high-temperature preservation characteristic deteriorated.

In Comparative Example 7, since a covering layer did not include Mn, a high-temperature preservation characteristic deteriorated. In Comparative Example 8, since a covering layer did not include Ni, a high-temperature preservation characteristic deteriorated. In Comparative Example 9, since core particles were not covered by a covering layer, a high-temperature preservation characteristic deteriorated.

In Comparative Example 10, a positive electrode active material was prepared by the method disclosed in Patent Literature 2, that is, by a method in which no covering layer was formed. Thus, there was a change in a diffusion state of Mn, a form effective in suppressing metal elution was not obtained, and a high-temperature preservation characteristic deteriorated.

In Comparative Example 11, the mole fraction $r_n$ of Ni and the mole fraction $r_m$ of Mn decreased from a surface of the composite particle toward the center. In addition, in a depth range in which a ratio d (%) satisfied 0.04%≤d≤0.20%, the mole fraction $r_n$, and the mole fraction $r_m$ were within ranges of 0.05≤$r_n$, and 0.05≤$r_m$, respectively. In addition, the ratio $r_{n2}/r_{n1}$ and the ratio $r_{m2}/r_{m1}$ were within ranges of 0.85≤$r_{n2}/r_{n1}$≤1.0 and 0.85≤$r_{m2}/r_{m1}$≤1.0, respectively. However, a decreased discharge capacity and a significantly decreased filling ability were observed. This is because the core particle was not covered by the covering layer, but the positive electrode active material was prepared with Ni and Mn that were in a solid solution state.

The embodiments, variations thereof, and examples of the present technology have been specifically described above. However, the present technology is not limited to the above-described embodiments, variations thereof, and examples. Various modifications of the present technology can be made without departing from the technical spirit of the present technology.

For example, the configurations, the methods, the processes, the shapes, the materials, the numerical values, and the like mentioned in the above-described embodiments, variations thereof, and examples are merely examples. Different configurations, methods, processes, shapes, materials, numerical values, and the like may be used, as necessary.

Further, configuration, methods, processes, shapes, materials, numerical values and the like in the above-described embodiments, variations thereof, and examples may be combined insofar as they are not departing from the spirit of the present technology.

The present technology may also be configured as below.

(1)

A positive electrode active material including:

a composite particle that includes a particle containing a lithium transition metal composite oxide and a layer that is provided on a surface of the particle and includes an oxide of Li, Ni and Mn, wherein Ni and Mn have a concentration distribution centered on the center from a surface of the composite particle, in a depth range in which a ratio d (%) satisfies 0.04%≤d≤0.20%, a mole fraction $r_n$ of Ni and a mole fraction $r_m$ of Mn are within ranges of 0.05≤$r_n$ and 0.05≤$r_m$, respectively, and when the mole fractions $r_n$ and $r_m$ of Ni and Mn in a depth in which the ratio d (%) satisfies d=0.04% are set as $r_{n1}$ and $r_{m1}$, respectively, and the mole fractions $r_n$ and $r_m$ of Ni and Mn in a depth in which the ratio d (%) satisfies d=0.20% are set as $r_{n2}$ and $r_{m2}$, respectively, a ratio $r_{n2}/r_{n1}$ and a ratio $r_{m2}/r_{m1}$ are within ranges of 0.85≤$r_{n2}/r_{n1}$≤1.0 and 0.85≤$r_{m2}/r_{m1}$≤1.0, respectively (where the ratio d (%)=[((mass of Co)+(mass of Ni)+(mass of Mn))/(total mass of particles)]×100; the mole fraction $r_n$ of Ni=(amount of substance of Ni)/((amount of substance of Co)+(amount of substance of Ni)+(amount of substance of Mn)); the mole fraction $r_m$=(amount of substance of Mn)/((amount of substance of Co)+(amount of substance of Ni)+(amount of substance of Mn))).

(2)

The positive electrode active material according to (1), wherein the mole fraction $r_n$ of Ni and the mole fraction $r_m$ of Mn decrease toward the center from a surface of the composite particle.

(3)

The positive electrode active material according to (1) or (2), wherein the lithium transition metal composite oxide included in the core particle has a layered rock salt structure.

(4)

The positive electrode active material according to (3), wherein the lithium transition metal composite oxide has an average composition that is represented by the following expression (A).

$$Li_xCo_{1-y}M_yO_{2-z} \qquad (A)$$

(where M is at least one of Mg, Al, B, Ti, V, Cr, Fe, Cu, Zn, Mo, Sn, W, Zr, Y, Nb, Ca, Sr, Bi, Na, K, Si, P, Mn, and Ni; x is 0≤x≤1.0; y is 0≤y<0.50; z is −0.10≤z≤0.20).

(5)

The positive electrode active material according to any of (1) to (4), wherein, in the depth range in which the ratio d (%) satisfies 0.04%≤d≤0.20%, the mole fraction $r_n$ and the mole fraction $r_m$ are within ranges of 0.05≤$r_n$≤0.10 and 0.05≤$r_m$≤0.10, respectively.

(6)

A positive electrode including:

the positive electrode active material according to any of (1) to (5).

(7)

A battery including:

the positive electrode according to (6).

(8)

A battery pack including:

the battery according to (7).

(9)

An electronic device including:

the battery according to (7), wherein the electronic device receives power supply from the battery.

(10)

An electric vehicle including:

the battery according to (7);

a conversion device configured to perform conversion into driving power of the vehicle upon reception of power supply from the battery; and a control device configured to perform information processing regarding vehicle control based on information regarding the battery.

(11)

A power storage device including:

the battery according to (7), wherein the power storage device supplies power to an electronic device connected to the battery.

(12)

The power storage device according to (11), including:

a power information control device configured to transmit and receive a signal to and from another device via a network, wherein the power storage device performs charge/discharge control of the battery based on information received by the power information control device.

(13)

A power system including:

the battery according to (7), wherein the power system receives power supply from the battery, or allows power to be supplied to the battery from a power generation apparatus or a power network.

REFERENCE SIGNS LIST 11 battery can
12, 13 insulator plate
14 battery lid
15 safety valve mechanism
15A disc plate
16 positive temperature coefficient element
17 gasket
20 wound electrode body
21 positive electrode
21A positive electrode current collector
21B positive electrode active material layer
22 negative electrode
22A negative electrode current collector
22B negative electrode active material layer
23 separator
24 center pin
25 positive electrode lead
26 negative electrode lead

The invention claimed is:

1. A positive electrode active material, comprising a composite particle that includes a particle containing a lithium transition metal composite oxide of Li and Co and a layer that is provided on a surface of the particle and includes an oxide of Li, Ni and Mn, wherein Ni and Mn have a concentration distribution centered on a center from a surface of the composite particle, in a depth range in which a ratio d (%) satisfies 0.04%≤d≤0.20%, a mole fraction $r_n$ of Ni and a mole fraction $r_m$ of Mn are within ranges of 0.05≤$r_n$≤0.10 and 0.05≤$r_m$≤0.10, respectively, and when the mole fractions $r_n$ and $r_m$ of Ni and Mn in a depth in which the ratio d (%) satisfies d=0.04% are set as $r_{n1}$ and $r_{m1}$, respectively, and the mole fractions $r_n$ and $r_m$ of Ni and Mn in a depth in which the ratio d (%) satisfies d=0.20% are set as $r_{n2}$ and $r_{m2}$, respectively, a ratio $r_{n2}/r_{n1}$ and a ratio $r_{m2}/r_{m1}$ are within ranges of 0.85≤$r_{n2}/r_{n1}$≤1.0 and 0.85≤$r_{m2}/r_{m1}$≤1.0, respectively (where the ratio d (%)=[((mass of Co)+(mass of Ni)+(mass of Mn))/(total mass of composite particles)]× 100; the mole fraction $r_n$ of Ni=(amount of substance of Ni)/((amount of substance of Co)+(amount of substance of Ni)+(amount of substance of Mn)); the mole fraction $r_m$=(amount of substance of Mn)/((amount of substance of Co)+(amount of substance of Ni)+(amount of substance of Mn))).

2. The positive electrode active material according to claim 1, wherein the mole fraction $r_n$ of Ni and the mole fraction $r_m$ of Mn decrease toward the center from a surface of the composite particle.

3. The positive electrode active material according to claim 1, wherein the lithium transition metal composite oxide included in the particle has a layered rock salt structure.

4. The positive electrode active material according to claim 3, wherein the lithium transition metal composite oxide has an average composition that is represented by a following expression (A)

$$Li_xCo_{1-y}M_yO_{2-z} \qquad (A)$$

(where M is at least one of Mg, Al, B, Ti, V, Cr, Fe, Cu, Zn, Mo, Sn, W, Zr, Y, Nb, Ca, Sr, Bi, Na, K, Si, P, Mn, and Ni; x is 0≤x≤1.0; y is 0≤y≤0.50; z is −0.10≤z≤0.20).

5. A positive electrode, comprising a positive electrode active material that includes a composite particle containing a particle including a lithium transition metal composite oxide of Li and Co and a layer that is provided on a surface of the particle and includes an oxide of Li, Ni and Mn, wherein Ni and Mn have a concentration distribution centered on a center from a surface of the composite particle, in a depth range in which a ratio d (%) satisfies 0.04%≤d≤0.20%, a mole fraction $r_n$ of Ni and a mole fraction $r_m$ of Mn are within ranges of 0.05≤$r_n$≤0.10 and 0.05≤$r_m$≤0.10, respectively, and when the mole fractions $r_n$ and $r_m$ of Ni and Mn in a depth in which the ratio d (%) satisfies d=0.04% are set as $r_{n1}$ and $r_{m1}$, respectively, and the mole fractions $r_n$ and $r_m$ of Ni and Mn in a depth in which the ratio d (%)

satisfies d=0.20% are set as $r_{n2}$ and $r_{m2}$, respectively, a ratio $r_{n2}/r_{n1}$ and a ratio $r_{m2}/r_{m1}$ are within ranges of $0.85 \leq r_{n2}/r_{n1} \leq 1.0$ and $0.85 \leq r_{m2}/r_{m1} \leq 1.0$, respectively (where the ratio d (%)=[((mass of Co)+(mass of Ni)+(mass of Mn))/(total mass of composite particles)]×100; the mole fraction $r_n$ of Ni=(amount of substance of Ni)/((amount of substance of Co)+(amount of substance of Ni)+(amount of substance of Mn)); the mole fraction $r_m$=(amount of substance of Mn)/((amount of substance of Co)+(amount of substance of Ni)+(amount of substance of Mn))).

6. A battery, comprising:

a positive electrode including a positive electrode active material;

a negative electrode; and an electrolyte, wherein the positive electrode active material includes a composite particle that includes a particle containing a lithium transition metal composite oxide of Li and Co and a layer that is provided on a surface of the particle and includes an oxide of Li, Ni and Mn, Ni and Mn have a concentration distribution centered on a center from a surface of the composite particle, in a depth range in which a ratio d (%) satisfies 0.04%≤d≤0.20%, a mole fraction $r_n$ of Ni and a mole fraction $r_m$ of Mn are within ranges of $0.05 \leq r_n \leq 0.10$ and $0.05 \leq r_m \leq 0.10$, respectively, and when the mole fractions $r_n$ and $r_m$ of Ni and Mn in a depth in which the ratio d (%) satisfies d=0.04% are set as $r_{n1}$ and $r_{m1}$, respectively, and the mole fractions $r_n$ and $r_m$ of Ni and Mn in a depth in which the ratio d (%) satisfies d=0.20% are set as $r_{n2}$ and $r_{m2}$, respectively, a ratio $r_{n2}/r_{n1}$ and a ratio $r_{m2}/r_{m1}$ are within ranges of $0.85 \leq r_{n2}/r_{n1} \leq 1.0$ and $0.85 \leq r_{m2}/r_{m1} \leq 1.0$, respectively (where the ratio d (%)=[((mass of Co)+(mass of Ni)+(mass of Mn))/(total mass of composite particles)]×100; the mole fraction $r_n$ of Ni=(amount of substance of Ni)/((amount of substance of Co)+(amount of substance of Ni)+(amount of substance of Mn)); the mole fraction $r_m$=(amount of substance of Mn)/((amount of substance of Co)+(amount of substance of Ni)+(amount of substance of Mn))).

7. A battery pack, comprising:

the battery according to claim 6.

8. An electronic device, comprising:

the battery according to claim 6, wherein the electronic device receives power supply from the battery.

9. An electric vehicle, comprising:

the battery according to claim 6;

a conversion device configured to perform conversion into driving power of the electric vehicle upon reception of power supply from the battery; and a control device configured to perform information processing regarding vehicle control based on information regarding the battery.

10. A power storage device, comprising:

the battery according to claim 6, wherein the power storage device supplies power to an electronic device connected to the battery.

11. The power storage device according to claim 10, further comprising a power information control device configured to transmit and receive a signal to and from another device via a network, wherein the power storage device performs charge/discharge control of the battery based on information received by the power information control device.

12. A power system, comprising:

the battery according to claim 6, wherein the power system receives power supply from the battery, or allows power to be supplied to the battery from a power generation apparatus or a power network.

* * * * *